US009874449B2

(12) United States Patent
Rolf

(10) Patent No.: US 9,874,449 B2
(45) Date of Patent: Jan. 23, 2018

(54) EFFICIENT AND ERROR TOLERANT MAPPING FROM A SOURCE GRAPH TO A TARGET GRAPH

(71) Applicant: HERE GLOBAL B.V., Eindhoven (NL)

(72) Inventor: Daniel Rolf, Berlin (DE)

(73) Assignee: HERE GLOBAL B.V., Eindhoven (NL)

( * ) Notice: Subject to any disclaimer, the term of this patent is extended or adjusted under 35 U.S.C. 154(b) by 39 days.

(21) Appl. No.: 15/012,506

(22) Filed: Feb. 1, 2016

(65) Prior Publication Data
US 2017/0219358 A1 Aug. 3, 2017

(51) Int. Cl.
*G01C 21/00* (2006.01)
*G09B 29/00* (2006.01)
*G06F 17/30* (2006.01)
*G01C 21/30* (2006.01)
*G01C 21/34* (2006.01)
*G01C 21/36* (2006.01)
*G01C 21/32* (2006.01)

(52) U.S. Cl.
CPC ............ *G01C 21/30* (2013.01); *G01C 21/32* (2013.01); *G01C 21/3446* (2013.01); *G01C 21/3667* (2013.01); *G06F 17/30241* (2013.01)

(58) Field of Classification Search
None
See application file for complete search history.

(56) References Cited

U.S. PATENT DOCUMENTS 6,728,631 B1 4/2004 Hessing
2013/0006935 A1* 1/2013 Grisby .............. G06F 17/30563
707/635

FOREIGN PATENT DOCUMENTS

WO WO 2008/010699 A1 1/2008

OTHER PUBLICATIONS

International Searching Authority, International Search Report and Written Opinion for International Application No. PCT/US2017/015945, dated May 9, 2017, 13 pages, European Patent Office, Netherlands.

* cited by examiner

*Primary Examiner* — Adam Tissot
(74) *Attorney, Agent, or Firm* — Alston & Bird LLP

(57) ABSTRACT

Methods, apparatus, and computer program products are provided. An example method comprises identifying an object in a source graph; defining a closure graph around the object in the source graph; building a closure set around the object based on the closure graph; identifying the anchor nodes of the closure set on the target graph; and deflating the closure set on the target graph to identify a target object in the target graph that corresponds to the object in the source graph. The object is identified by a directed way and an offset there along. An anchor node is a junction that is tagged with a junction identifier configured to uniquely identify the junction in both the source graph and a target graph.

20 Claims, 13 Drawing Sheets

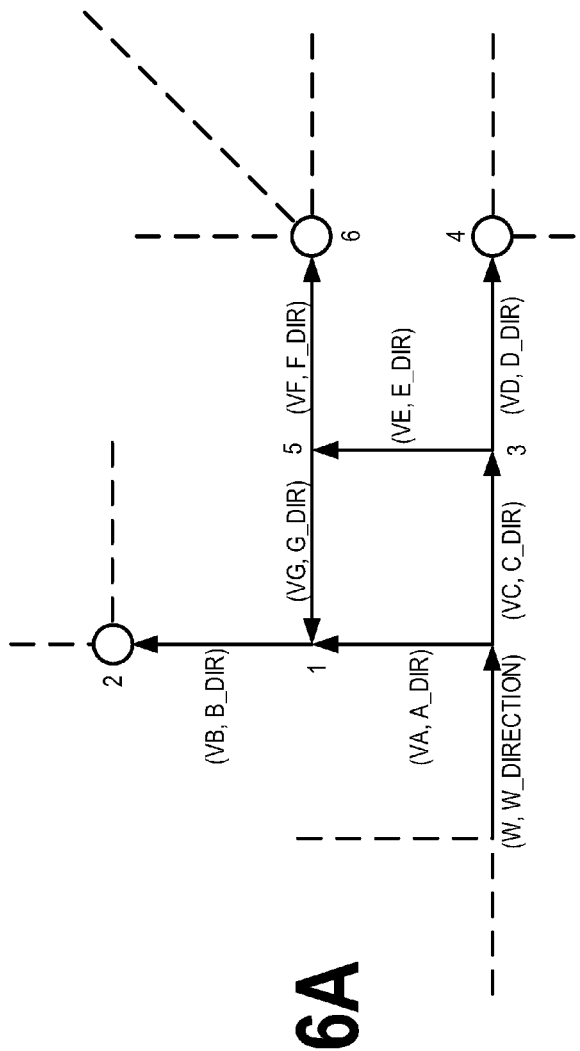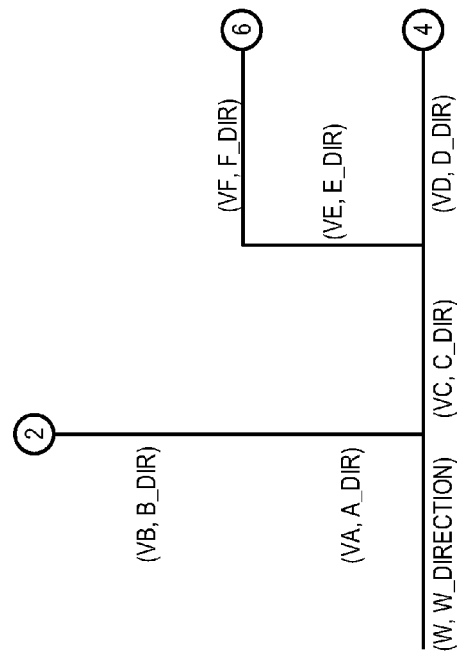
FIG. 6A
FIG. 6B

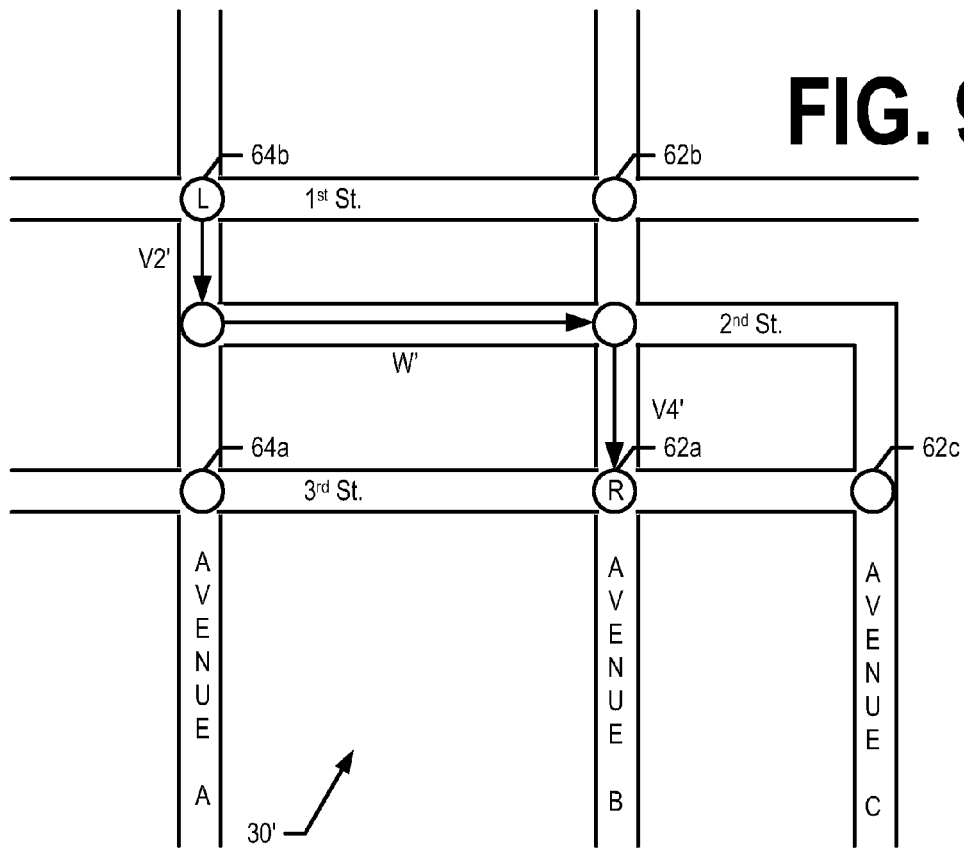
FIG. 9A
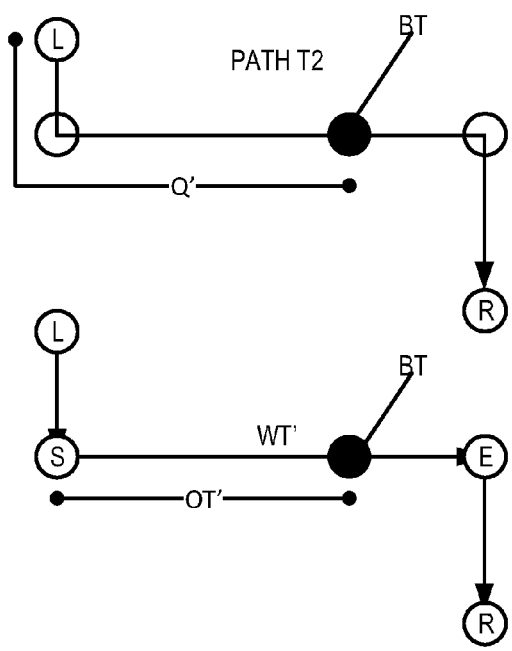
FIG. 9B
FIG. 9C

US 9,874,449 B2

EFFICIENT AND ERROR TOLERANT MAPPING FROM A SOURCE GRAPH TO A TARGET GRAPH

TECHNOLOGICAL FIELD

Example embodiments relate generally to the mapping of an object in a source graph to an object in a target graph, for example, for display to a user via a user interface. Some example embodiments relate to hybrid navigation applications.

BACKGROUND

In car navigation systems allow users to map locations and/or navigation paths or routes to/from locations. For example, a user may use an in car navigation system to provide directions (displayed, for example, as a map and/or turn by turn instructions) for driving from the user's current location to another location. In car navigation systems may comprise various maps. For example, an in car navigation system may comprise a two dimensional (2D) map and a three dimensional (3D) map. In another example, an in car navigation system may comprise a map version from September 2015 and an updated version of the same map from December 2015. In various scenarios the in car navigation system may need to map a point or path in one map into another map. For example, the user may be navigating using a 2D map and request that the map view be changed to the 3D map. The in car navigation system must then map the path to the location from the 2D map to the 3D map for display to the user. In another example, a live map may be updated to indicate current traffic speeds or speed limits. These updates need to be mapped to the 2D or 3D map displayed to the user. However, the map information/data of a first map may not be directly matchable to the map information/data of a second map. For example, link or roadway identifying information may be changed between different maps or different versions of a map. For example, a particular road in one map may be listed as US 23 and in another map as Claremont Ave.

BRIEF SUMMARY

A method, apparatus and computer program product are provided in accordance with an example embodiment in order to map point objects and/or linear objects from a source graph to corresponding point objects and/or linear objects in a target graph. In example embodiments, a closure graph is defined around an identified point object in the source graph. A right closure set and a left closure set are then built based on the closure graph. Each closure set comprises at least one path having either a start node or end node of the directed way at a first end of the path and an anchor node at a second end of the path. The second end of the path is opposite the first end of the path. In example embodiments, an anchor node is a junction (e.g., a node having three or more inlet/outlets associated therewith) that is identified by the same junction identifier in both the source graph and the target graph. The anchor nodes of the closure set are identified in the target graph based on the junction identifiers corresponding to the anchor nodes. In these example embodiments, the closure set is then deflated in the target graph to identify the target object mapped into the target graph corresponding to the object in the source graph.

In example embodiments, a linear object may be mapped from a source graph to a target graph as a series of point objects.

In accordance with an example embodiment, a method is provided that includes identifying an object in a source graph. The object is identified by a directed way and an offset there along. The method further comprises defining a closure graph around the object in the source graph, the closure graph comprising at least one vertex and building at least one closure set based on the closure graph. The closure set comprises at least one path having either a start node or end node of the directed way at a first end of the path and an anchor node at a second end of the path, wherein the second end of the path is opposite the first end of the path. An anchor node is a junction that is tagged with a junction identifier. The junction identifier is configured to uniquely identify the junction in both the source graph and a target graph. The method further comprises identifying the anchor nodes of the closure set on the target graph. The identifying of the anchor nodes in the target graph is based at least in part on the junction identifier associated with the anchor node. The method further comprises deflating the closure set on the target graph to identify a target object in the target graph that corresponds to the object in the source graph.

In an example embodiment, the method comprises performing a consistency check. For example, in an example embodiment, the method further comprises mapping the target object back into the source graph, determining a distance between the target object that was mapped back into the source graph and the object in the source graph; and determining whether the distance is greater than a consistency check threshold.

In an example embodiment, defining the closure graph around the object in the source graph comprises identifying a set of ways that have either an end point of the directed way as a start point of the way or a start point of the directed way as an end point of the way. In an example embodiment, building the closure set comprises visiting each way marked as to be visited. For each way marked to be visited, the method comprises: determining if an end node of the way is a first anchor node; if the end node of the way is not a first anchor node, marking all ways outgoing from the end node of the way as to be visited. If the end node of the way is a first anchor node, the method comprises adding a path from either the start node or the end node of the directed way to the anchor node to the closure set, and not marking any ways outgoing from the first anchor node as to be visited. In various embodiments, visiting each way marked as to be visited comprises using a modified Dijkstra's algorithm.

In an example embodiment, the at least one closure set comprises (a) a left closure set comprising one or more left anchor nodes and (b) a right closure set comprising one or more right anchor nodes, and wherein deflating the closure set in the target graph comprises. In such example embodiments, deflating the closure set in the target graph comprises, for each pair of left and right anchor nodes, identifying a set of shortest paths from the left anchor node to the right anchor node. Each of the shortest paths of the set of shortest paths corresponds to one way associated with the start anchor node. For each path in the set of shortest paths: a length of the path is determined and it is determined that the length of the path is not greater than a threshold length for the left and right anchor node pair; a target offset along the path is computed; and a descriptor of the quality of mapping of the path is computed. The path having the highest quality of mapping as indicated by the descriptor of the quality of mapping of the path is selected and the target object is identified based at least in part on the target offset of the selected path. In an example embodiment, the descriptor of the quality of the mapping of the path is a penalty corresponding to the path that is computed based at least in part on a distance between at least one point on the shortest path from the left anchor node to the right anchor node that includes the directed way in the source graph and a corresponding at least one point on the path and wherein a lower penalty indicates a higher quality of mapping. In an example embodiment, the set of shortest paths from the start anchor to the right anchor node comprises using Dijkstra's algorithm.

In an example embodiment, the object being mapped is one of a start point object, end point object, or midway point object of a linear object being mapped from the source graph to the target graph.

In another example embodiment, an apparatus is provided that includes at least one processor and at least one memory storing computer program code with the at least one memory and the computer program code configured to, with the processor, cause the apparatus to at least identify an object in a source graph. The object is identified by a directed way and an offset there along. The at least one memory and the computer program code are also configured to, with the processor, cause the apparatus to define a closure graph around the object in the source graph, the closure graph comprising at least one vertex and build at least one closure set based on the closure graph. The closure set comprises at least one path having either a start node or end node of the directed way at a first end of the path and an anchor node at a second end of the path, wherein the second end of the path is opposite the first end of the path. An anchor node is a junction that is tagged with a junction identifier. The junction identifier is configured to uniquely identify the junction in both the source graph and a target graph. The at least one memory and the computer program code are further configured to, with the processor, cause the apparatus to identify the anchor nodes of the closure set in the target graph. The identifying is based at least in part on the junction identifier associated with the anchor node. The at least one memory and the computer program code are also configured to, with the processor, cause the apparatus to deflate the closure set on the target graph to identify a target object in the target graph that corresponds to the object in the source graph.

In an example embodiment, the at least one memory and the computer program code are configured to, with the processor, cause the apparatus to complete a consistency check. For example, in an example embodiment, the at least one memory and the computer program code are configured to, with the processor, cause the apparatus to map the target object back into the source graph; determine a distance between the target object that was mapped back into the source graph and the object in the source graph; and determine whether the distance is greater than a consistency check threshold.

In an example embodiment, to define the closure graph around the object in the source graph the at least one memory and the computer program code are configured to, with the processor, cause the apparatus to identify a set of ways that have either an end point of the directed way as a start point of the way or a start point of the directed way as an end point of the way. In an example embodiment, to build the closure set the at least one memory and the computer program code are configured to, with the processor, cause the apparatus to, visit each way marked as to be visited. For each way marked to be visited, the at least one memory and the computer program code are configured to, with the processor, cause the apparatus to determine if an end node of the way is a first anchor node. If the end node of the way is not a first anchor node, the at least one memory and the computer program code are configured to, with the processor, cause the apparatus to mark all ways outgoing from the end node of the way as to be visited. If the end node of the way is a first anchor node, the at least one memory and the computer program code are configured to, with the processor, cause the apparatus to add a path from either the start node or the end node of the directed way to the anchor node to the closure set and not mark any ways outgoing from the first anchor node as to be visited. In an example embodiment, visiting each way marked as to be visited comprises using a modified Dijkstra's algorithm.

In an example embodiment, the at least one closure set comprises (a) a left closure set comprising one or more left anchor nodes and (b) a right closure set comprising one or more right anchor nodes. In an example embodiment, to deflate the closure set in the target graph the at least one memory and the computer program code are configured to, with the processor, cause the apparatus to, for each pair of left and right anchor nodes, identify a set of shortest paths from the left anchor node to the right anchor node. Each of the shortest paths of the set of shortest paths corresponds to one way associated with the left anchor node. The at least one memory and the computer program code are further configured to, with the processor, cause the apparatus to, for each path in the set of shortest paths, determine a length of the path and determine that the length of the path is not greater than a threshold length for the left and right anchor node pair; compute a target offset along the path; and compute a descriptor of the quality of mapping of the path. The at least one memory and the computer program code are further configured to, with the processor, cause the apparatus to select the path having the highest quality of mapping as indicated by the descriptor of the quality of mapping of the path and identify the target object based at least in part on the target offset of the selected path. In an example embodiment, the descriptor of the quality of the mapping of the path is a penalty that is computed based at least in part on a distance between at least one point on the shortest path from the left anchor node to the right anchor node that includes the directed way in the source graph and a corresponding at least one point on the path and wherein a lower penalty indicates a higher quality of mapping. In an example embodiment, to identify the set of shortest paths from the left anchor node to the right anchor node, the at least one memory and the computer program code are configured to, with the processor, cause the apparatus to apply Dijkstra's algorithm.

In an example embodiment, the object is one of a start point object, an end point object, or a midway point object of a linear object being mapped from the source graph to the target graph.

In a further example embodiment, a computer program product is provided that includes at least one non-transitory computer-readable storage medium having computer-executable program code instructions stored therein with the computer-executable program code instructions including program code instructions configured to identify an object in a source graph. The object is identified by a directed way and an offset there along. The computer-executable program code instructions also include program code instructions configured to define a closure graph around the object in the source graph, the closure graph comprising at least one vertex, and build at least one closure set based on the closure graph. The closure set comprises at least one path having either a start node or end node of the directed way at a first end of the path and an anchor node at a second end of the path, wherein the second end of the path is opposite the first end of the path. An anchor node is a junction that is tagged with a junction identifier. The junction identifier is configured to uniquely identify the junction in both the source graph and a target graph. The computer-executable program code instructions further include program code instructions configured to identify the anchor nodes of the closure set on the target graph. The identifying is based at least in part on the junction identifier associated with the anchor node. The computer-executable program code instructions further include program code instructions configured to deflate the closure set on the target graph to identify a target object in the target graph that corresponds to the object in the source graph.

In an example embodiment, the computer-executable program code instruction further comprise program code instructions configured to conduct a consistency check of the mapping. For example, in an example embodiment, the computer-executable program code instructions further comprise program code instructions configured to map the target object back into the source graph; determine a distance between the target object that was mapped back into the source graph and the object in the source graph; and determine whether the distance is greater than a consistency check threshold.

In an example embodiment, to build the closure set around the object in the source graph the computer-executable program code instructions further comprise program code instructions configured to identify a set of ways that have either an end point of the directed way as a start point of the way or a start point of the directed way as an end point of the way. In an example embodiment, to inflate the closure set the computer-executable program code instructions further comprise program code instructions configured to, for each way in the closure set, identify a shortest path to an anchor node; and add the shortest path to the anchor node to the closure set. In an example embodiment, the shortest path is identified by using a modified Dijkstra's algorithm.

In an example embodiment, each anchor node of the closure set is either a left anchor node associated with a vector from the left anchor node to a start point of the directed way, an right anchor node associated with a vector from an end point of the directed way to the right anchor node, or both. In an example embodiment, to deflate the closure set in the target graph the computer-executable program code instructions further comprise program code instructions configured to, for each pair of left and right anchor nodes, identify a set of shortest paths from the left anchor node to the end anchor node. Each of the shortest paths of the set of shortest paths corresponds to one way associated with the left anchor node. The computer-executable program code instructions also comprise computer program code instructions configured to, for each path in the set of shortest paths, determine a length of the path and determine that the length of the path is not greater than a threshold length for the left and right anchor node pair; compute a target offset along the path; and compute a descriptor of the quality of mapping of the path. The computer-executable program code instructions also comprise computer program code instructions configured to select the path having the highest quality of mapping as indicated by the descriptor of the quality of mapping of the path; and identify the target object based at least in part on the target offset of the selected path. In an example embodiment, the descriptor of the quality of the mapping of the path is a penalty that is computed based at least in part on a distance between at least one point on the shortest path from the left anchor node to the right anchor node that includes the directed way in the source graph and a corresponding at least one point on the path and wherein a lower penalty indicates a higher quality of mapping. In an example embodiment, to identify the set of shortest paths from the left anchor node to the right anchor node the computer-executable program code instructions further comprise program code instructions configured to apply Dijkstra's algorithm.

In an example embodiment, the object is one of a start point object, an end point object, or a midway point object of a linear object being mapped from the source graph to the target graph.

In yet another example embodiment, an apparatus is provided that includes means for identifying an object in a source graph. The object is identified by a directed way and an offset there along. The apparatus of this example embodiment also includes means for building a closure set around the object in the source graph, the closure set comprising at least one vertex, and means for inflating the closure set around the object such that the at least one vertex of the closure set has an anchor node as either the vertex's start or end node, or both. An anchor node is a junction that is tagged with a junction identifier. The junction identifier is configured to uniquely identify the junction in both the source graph and a target graph. The apparatus of this example embodiment further includes means for identifying the anchor nodes of the closure set on the target graph. The identifying is based at least in part on the junction identifier associated with the anchor node. The apparatus of this example embodiment also includes means for deflating the closure set on the target graph to identify a target object in the target graph that corresponds to the object in the source graph.

BRIEF DESCRIPTION OF THE DRAWINGS

Figure 1:
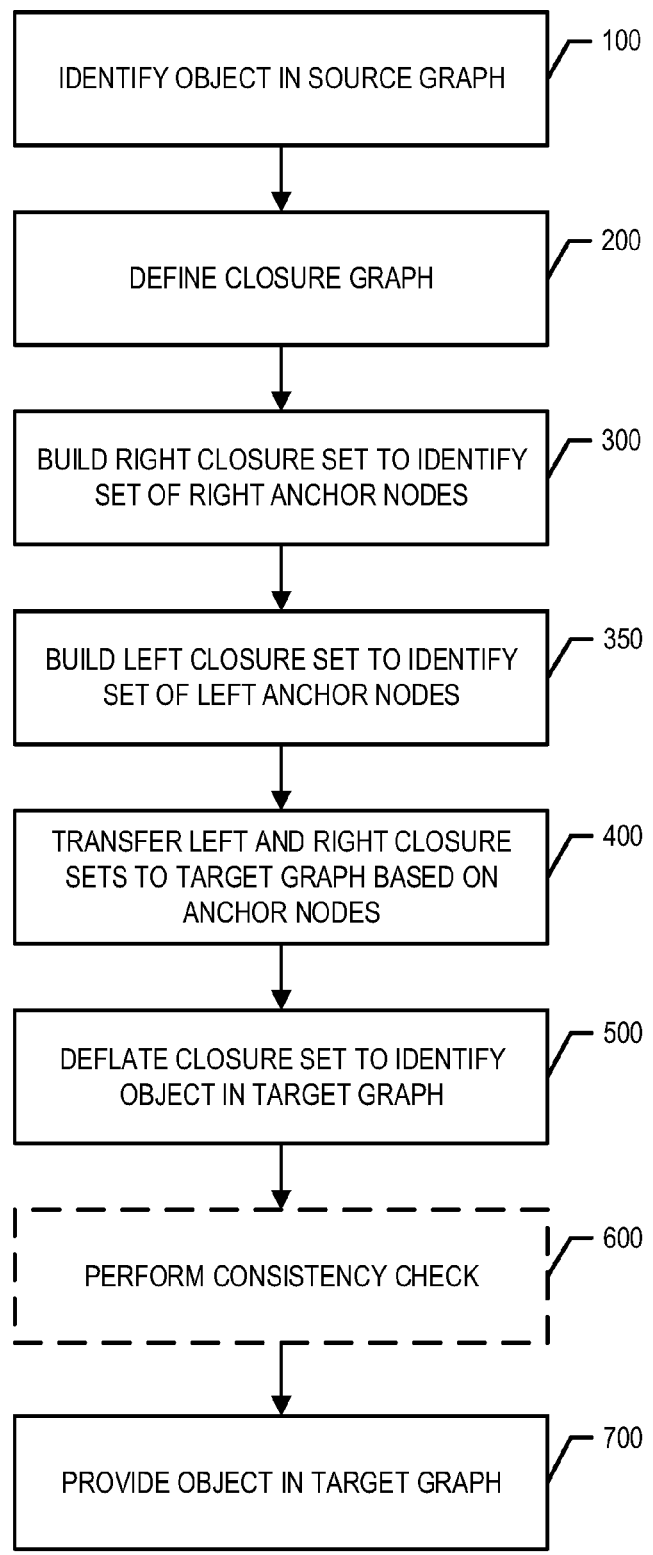
Figure 2:
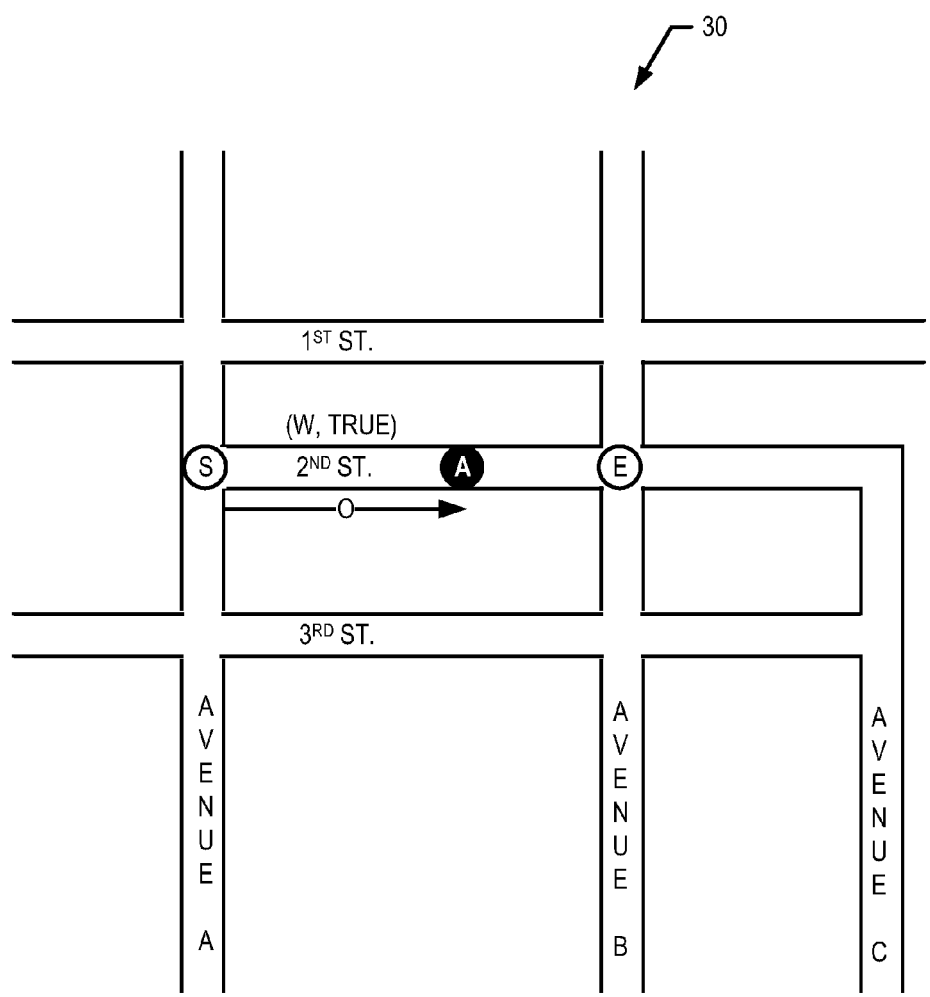
Figure 3:
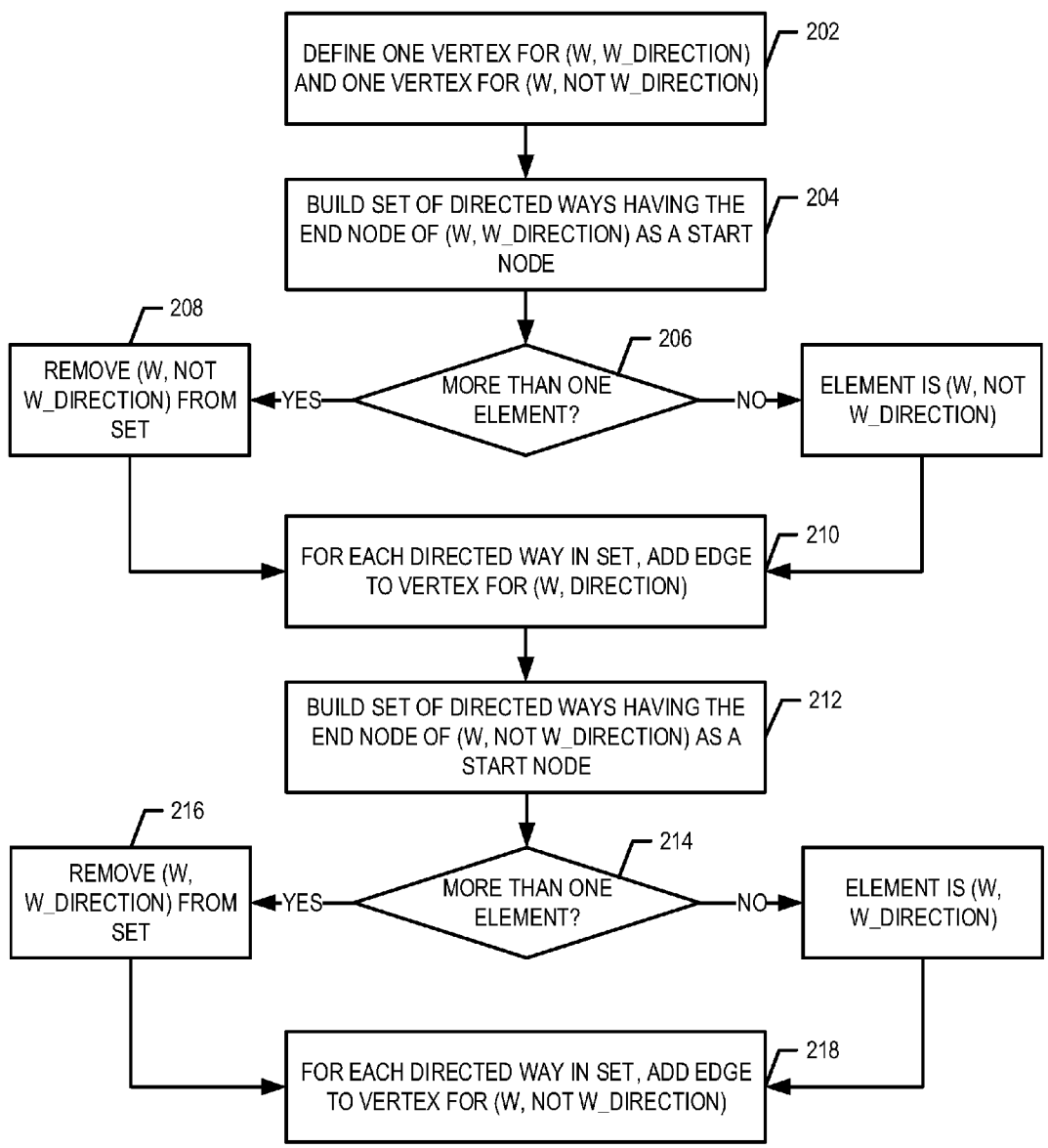
Figure 4:
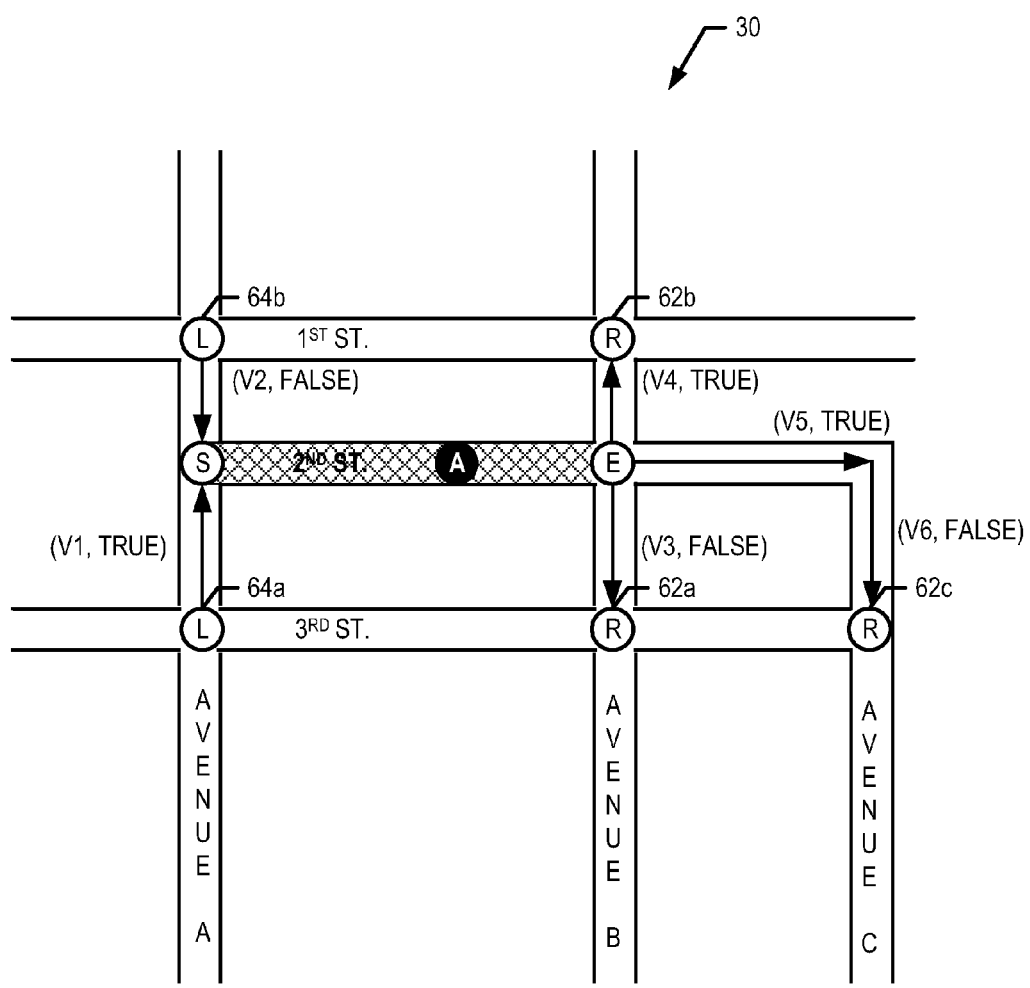
Figure 5:
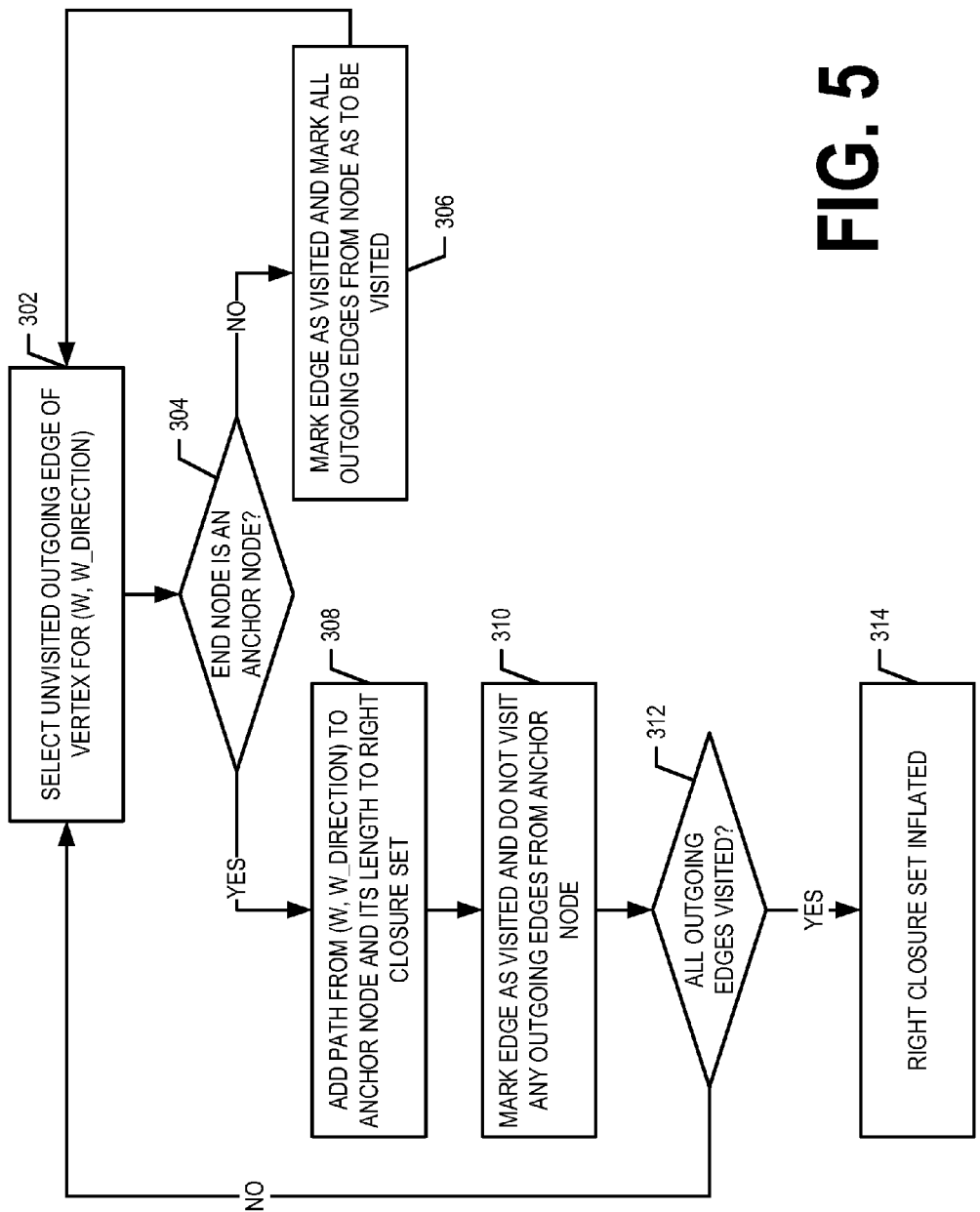
Figure 7:
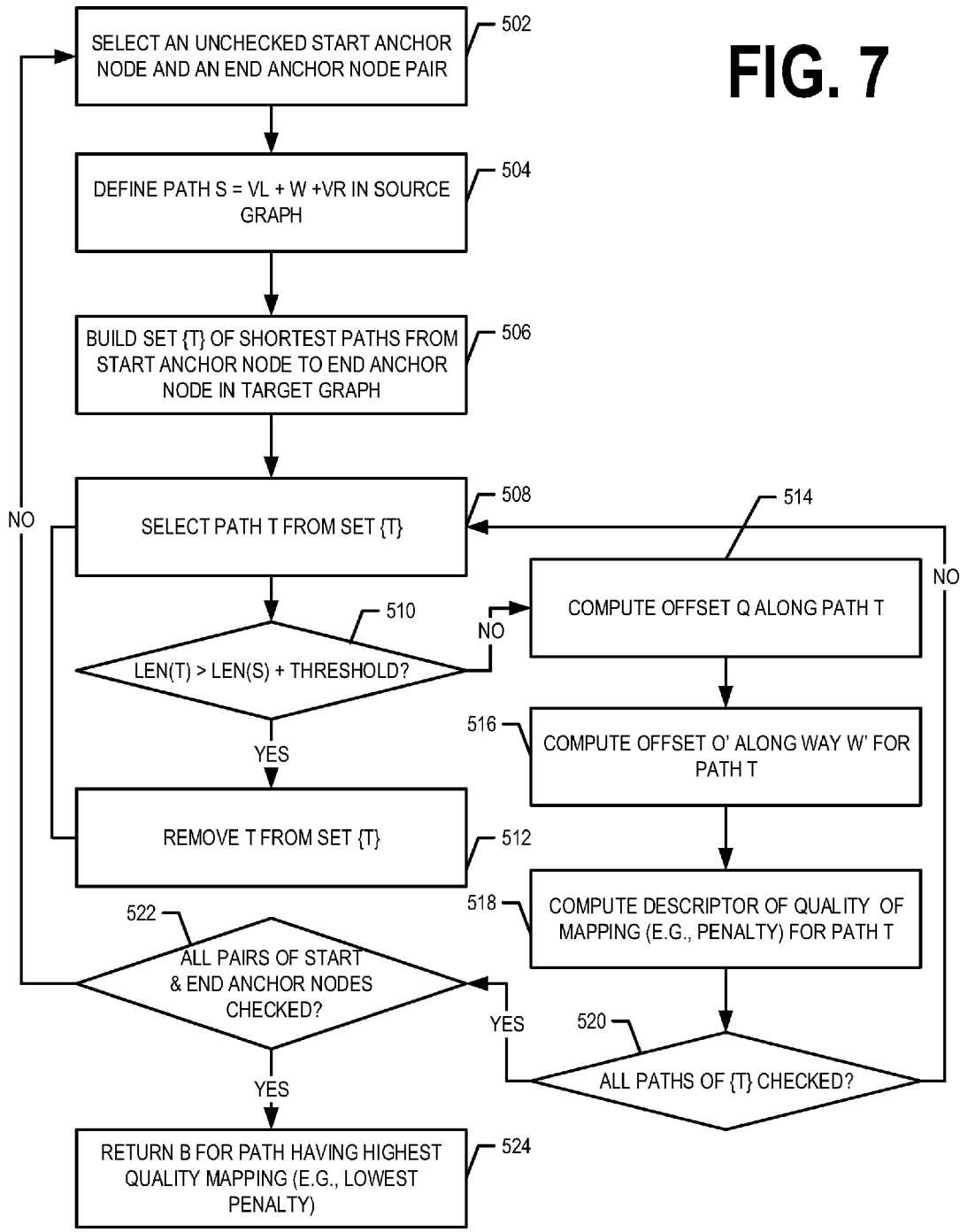
Figure 10:
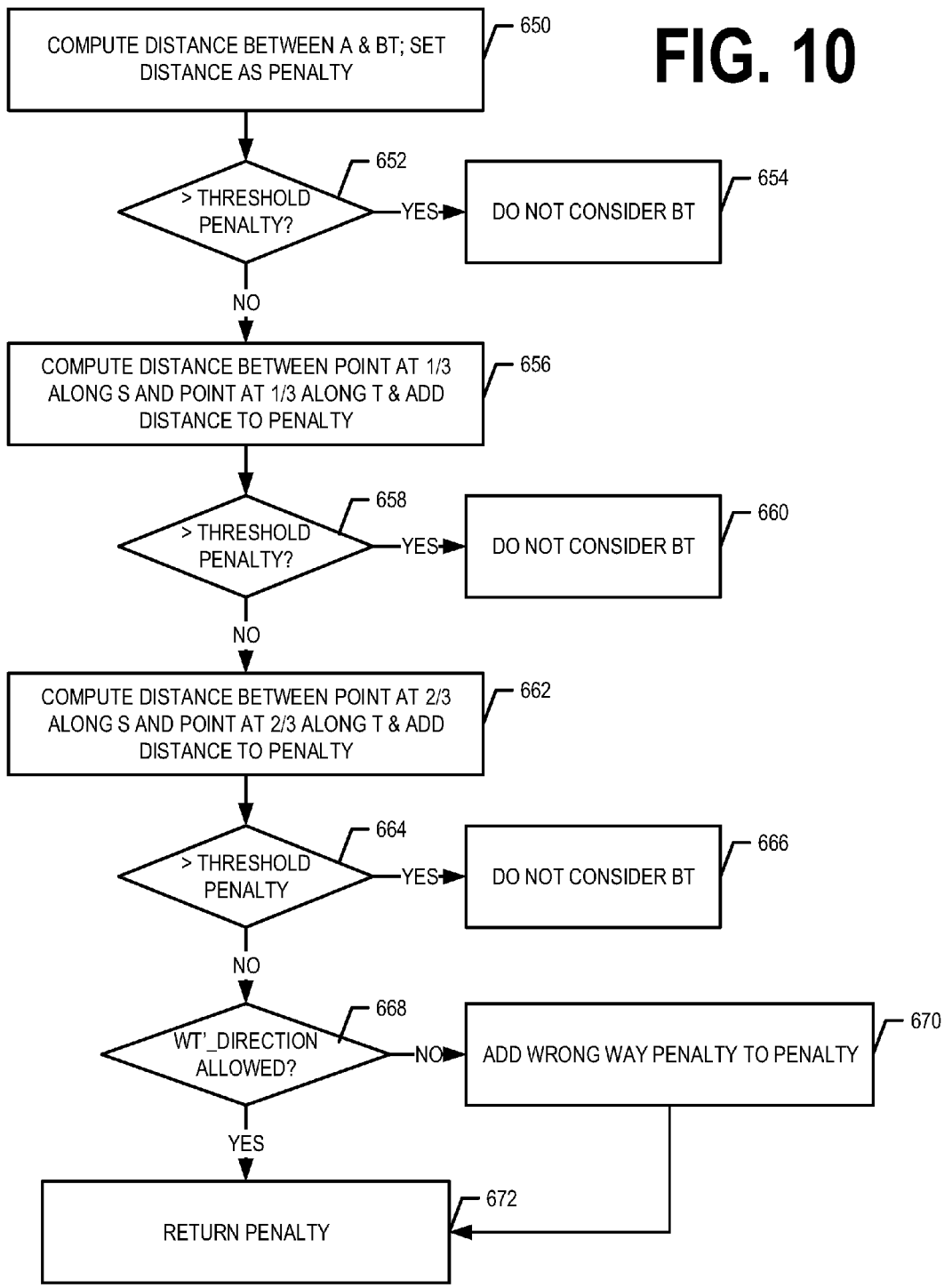
Figure 11:
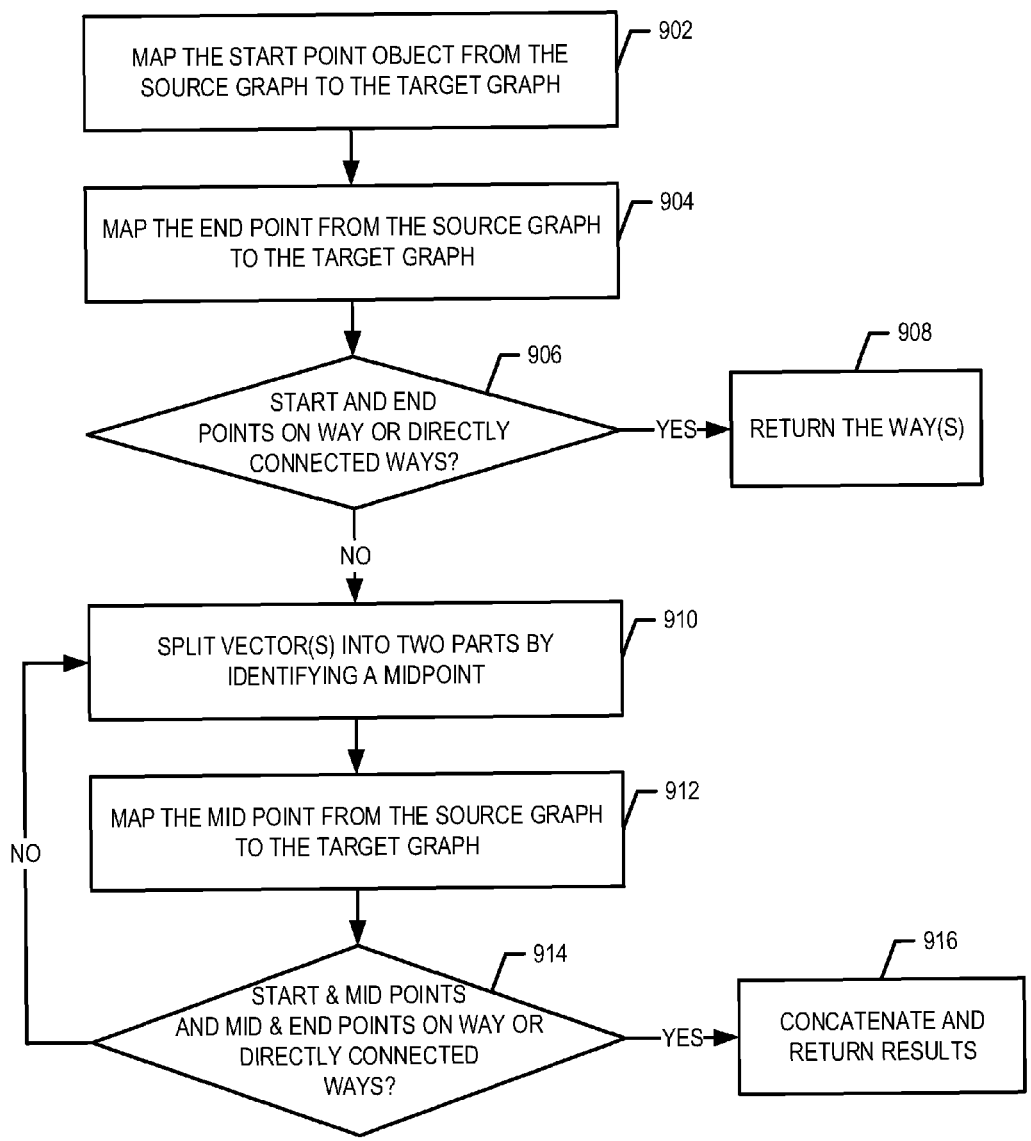
Figure 12:
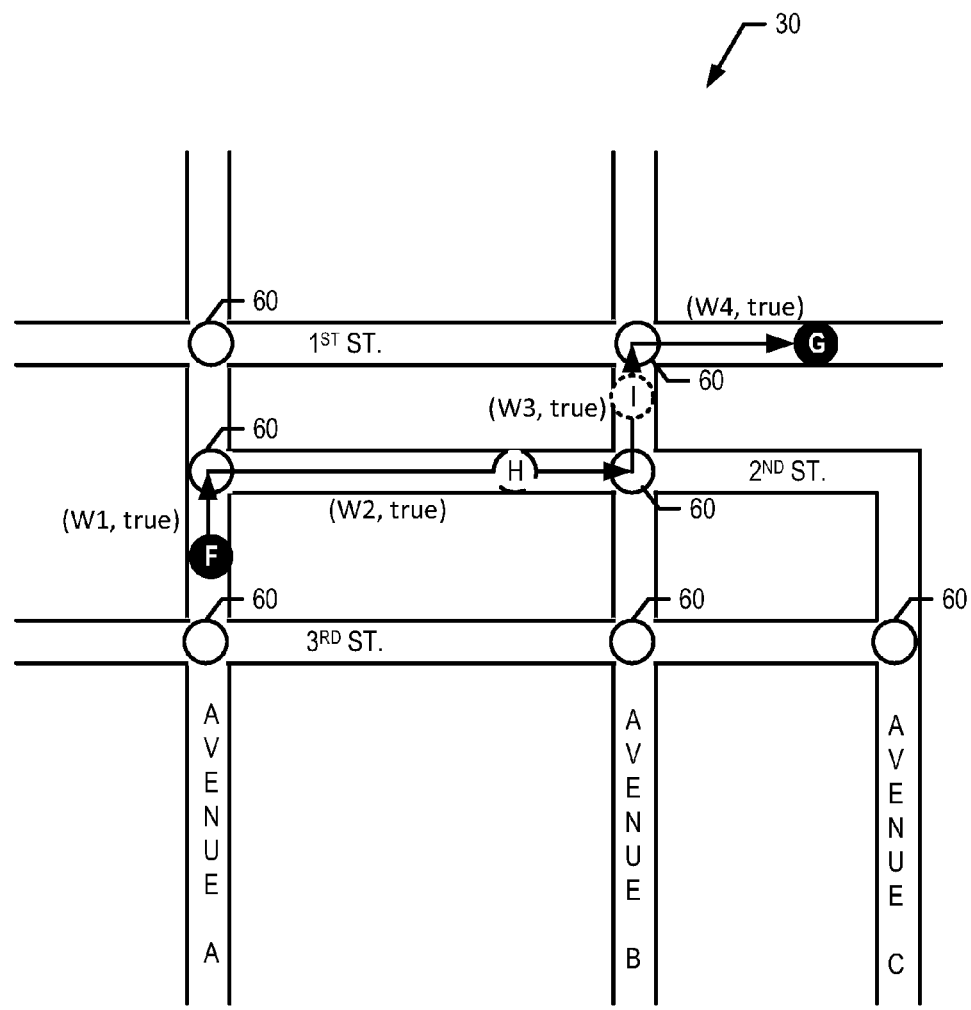
Figure 13:
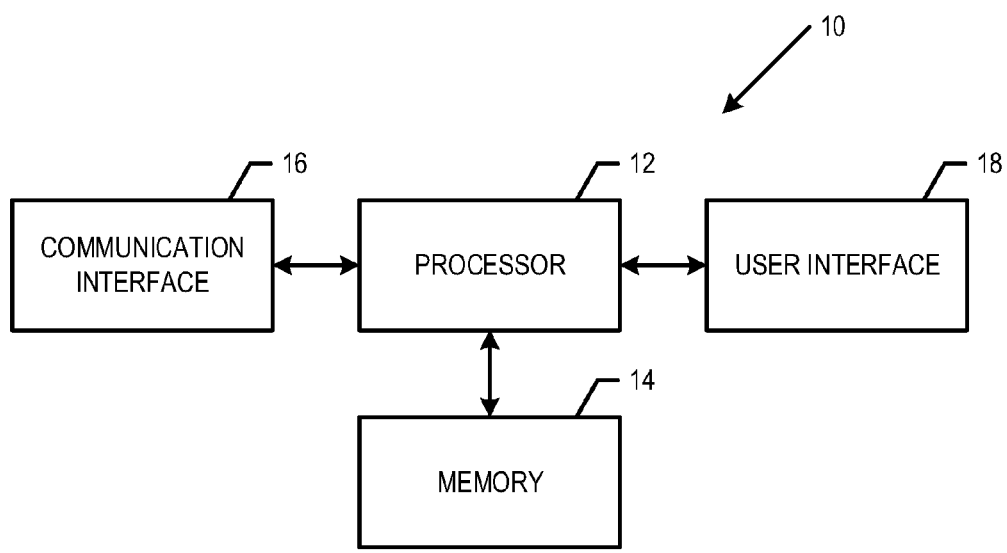

Having thus described certain example embodiments in general terms, reference will hereinafter be made to the accompanying drawings, which are not necessarily drawn to scale, and wherein:

FIG. 1 is a flowchart illustrating operations performed, such as by the apparatus of FIG. 13, in order to map a point object in the source graph into the target graph, in accordance with an example embodiment;

FIG. 2 is a diagram of a point object in a portion of a source graph, in accordance with an example embodiment;

FIG. 3 is a flowchart illustrating operations performed, such as by the apparatus of FIG. 13, in order to build and inflate a closure set in the source graph, in accordance with an example embodiment;

FIG. 4 is a diagram illustrating an inflated closure set, in accordance with an example embodiment;

FIG. 5 is a flowchart illustrating operations performed, such as by the apparatus of FIG. 13, in order to inflate a closure set in the closure graph, in accordance with an example embodiment;

FIGS. 6A and 6B are diagrams showing the inflation of a closure set based on a closure graph, in accordance with an example embodiment;

FIG. 7 is a flowchart illustrating operations performed, such as by the apparatus of FIG. 13, in order to deflate a closure set in the target graph, in accordance with an example embodiment;

FIGS. 8A, 8B, 8C, 9A, 9B, and 9C are diagrams showing various operations for deflating a closure set in the target graph, in accordance with an example embodiment;

FIG. 10 is a flowchart illustrating operations performed, such as by the apparatus of FIG. 13, in order to determine a penalty for a path, in accordance with an example embodiment;

FIG. 11 is a flowchart illustrating operations performed, such as by the apparatus of FIG. 13, in order to map a linear object in the source graph into the target graph, in accordance with an example embodiment;

FIG. 12 is a diagram of a linear object in a portion of the source graph, in accordance with an example embodiment; and FIG. 13 is a block diagram of an apparatus that may be specifically configured in accordance with an example embodiment.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

I. General Overview

Methods, apparatus and computer program products are provided in accordance with an example embodiment in order to map an object from a source graph to a target graph in an efficient, robust, and error tolerant manner. For example, a user may be using an apparatus, such as the example apparatus 10 diagramed in FIG. 13, to navigate from a first location to a second location. As discussed in more detail below, the apparatus 10 may comprise a processor 12, memory 14, a user interface 16, a communications interface 18 and/or other components configured to perform various operations, procedures, functions or the like described herein. For example, the apparatus 10 may provide the user (e.g., via a user interface 16) with a path from the first location to the second location on a 2D view of a graph or map. While navigating, the user chooses to change from a 2D view to a 3D view. The navigation path previously provided via the 2D view must be quickly and robustly mapped to a navigation path that is then provided via the 3D view of a graph of map. For example, the apparatus 10 may map the navigation path in the 2D view to a navigation path in the 3D view. The mapping must be quick enough and robust enough to prevent the user from having difficulties navigating the path while the mapping occurs.

In example embodiments, a graph comprises a plurality of nodes and edges that each connect two nodes. Various nodes may be associated with only one edge, two edges, or three or more edges. For example, a first node may be an end point of two edges. The first node is therefore associated with two edges. Nodes associated with three of more edges are referred to herein as junctions. For example, a junction may represent an intersection having at least three inlets/outlets. At least some of the junctions in a graph may be tagged or associated with a junction identifier configured to uniquely identify the junction in both the source graph and the target graph. Additionally, each edge may be associated with a weight. For example, the weight of an edge may represent the length of the way or road section represented by the edge. In various embodiments, a way may be a road, street, highway, freeway, thoroughfare, and/or the like. In some embodiments, a way may be a bike path or pedestrian path. In various embodiments, information/data regarding the nodes and edges of the graph and/or other map information/data are stored in a geographic database, as described in more detail below.

In example embodiments, a source point object may be identified in a source graph. For example, the source point object may be a point of interest (POI), an address, and/or the like. Example embodiments may provide for mapping or matching a source point object in a source graph into a target point object in a target graph. In example embodiments, to map a source point object in the source graph into the target graph a closure set around the point object may be built. The closure set may then be inflated until each path of the closure set is terminated at a junction that is tagged with a junction identifier. A junction that is tagged with a junction identifier may be referred to as an anchor node of the closure set. The closure set may then be mapped to the target graph. For example, in various embodiments, each anchor node of the closure set in the source graph is mapped to the corresponding anchor node in the target graph. In example embodiments, an intersection tagged with a junction identifier in the source graph where there is an intersection in the target graph with the same junction identifier is called an anchor node in the source graph (similarly, the corresponding intersection in the target graph is called an anchor node in the target graph). On the contrary, an intersection that is tagged with a junction identifier in the source graph for which there is not an intersection in the target graph with the same junction identifier is not considered an anchor node. In various embodiments, the closure set in the target graph is deflated to identify and/or determine a target point object in the target graph corresponding to the source point object in the source graph. In example embodiments, a consistency check is completed in which the target point object is mapped back into the source object to determine if the mapping of the target point object into the source graph is consistent with the source point object. The target point object in the target graph may then be provided to the user (e.g., via a user interface 16 of the apparatus 10).

In various embodiments, a linear object may be identified in a source graph. For example, a linear object may be a path from a first location to a second location. For example, a linear object may be a navigation path from a first location to a second location. Example embodiments may provide for mapping or matching a source linear object in the source graph into a target linear graph in the target graph. In example embodiments, a linear object in the source graph is defined by at least a start point and an end point, representing the first location and the second location, in the source graph. In example embodiments, the linear object in the source graph is mapped to a linear object in the target graph by mapping at least the start point and end point of the linear object from the source graph into the target graph.

II. Mapping a Point Object from the Source Graph into the Target Graph

FIG. 1 provides a flowchart illustrating various operations and procedures that may be completed in accordance with an example embodiment of the present invention to map a source point object in a source graph into a target point object in the target graph. Starting at block 100, an object (e.g., a source point object) is identified in the source graph. For example, the apparatus 10 may identify an object in the source graph. For example, the apparatus 10 may comprise means, such as the processor 12, the user interface 16, the communication interface 18 or the like, for identifying an object in the source graph. In various embodiments, the object may be identified based on user input (e.g., provided to the user interface 16). For example, the user may select a point in a graph, enter an address, select an address displayed on a website or stored in association with contact information, a user provided query, and/or the like. In another example, the object may be identified based on location information determined by a location sensor (e.g., GPS receiver) of the apparatus 10. In an example embodiment, the object is identified based at least in part on map information/data stored in the geographic database (e.g., stored by and/or accessible to the apparatus 10).

FIG. 2 illustrates a portion of an example source graph 30, in accordance with an example embodiment. For example, the apparatus 10 may display such a portion of a source graph 30 (e.g., via the user interface 16). The object A is located on 2$^{nd}$ St. between Ave. A and Ave. B. The way or street portion W of 2$^{nd}$ St. between Ave. A and Ave. B is defined by start node S and end node E. In an example embodiment, a direction along the way W is defined as true if the direction is from the start node S to the end node E and defined as false if the direction is from the end node E to the start node S. In an example embodiment, the object A is identified by a directed way and an offset along that way. For example, as shown in FIG. 2, the object A may be identified by the way W along which the object A is located, a direction along the way W, and an offset O along the way W from either the start node (if the direction along W is true) or end node (if the direction along W is false) at which the object is located. In general, the directed way x and the corresponding direction x_direction may be referred to as (x, x_direction).

Continuing to block 200 in FIG. 1, a closure graph is built based on map information data of the source graph. For example, the apparatus 10 may build a closure graph based on the source graph map data/information. For example, the apparatus 10 may comprise means, such as the processor 12, the user interface 16, or the like, for building a closure graph based on the source graph map data/information. For example, the closure graph may be an inverted graph including ways in the vicinity of the object A and based on the map data/information of the source graph. Moreover, the closure graph may only contain U-turns at dead-ends. However, directed ways that are not allowed to drive (e.g. violating a one-way road) may be included in the closure graph. For example, in defining a closure graph, a vertex corresponding to directed way (W, W_direction) and a vertex corresponding to the inverted directed way (W, not W_direction) may be defined. For example, if directed way (W, W_direction) is (W, true), then inverted directed way (W, not W_direction) is (W, false). Defining a closure graph will be described in more detail below.

At block 300, an inflated right closure set is built based on the closure graph. For example, the apparatus 10 may build an inflated right closure set based on the closure graph. For example, the apparatus 10 may comprise means, such as the processor 12, the user interface 16, or the like, for building an inflated right closure set based on the closure graph. For example, the right closure set may be built such that the right closure set includes a set of shortest paths to a set of right anchor nodes in the vicinity of the object A. For example, the vertex corresponding to (W, W_direction) may be relaxed until one or more paths between the end node E and a right anchor node are determined. An example process for building an inflated right closure set based on the closure graph is described in more detail below.

At block 350, an inflated left closure set is built based on the closure graph. For example, the apparatus 10 may build an inflated left closure set based on the closure graph. For example, the apparatus 10 may comprise means, such as the processor 12, the user interface 16, or the like, for building an inflated left closure set based on the closure graph. For example, the left closure set may be built such that the left closure set includes a set of shortest paths to a set of left anchor nodes in the vicinity of the object A. For example, the vertex corresponding to (W, not W_direction) may be relaxed until one or more paths between the end node S and a left anchor node are determined. In general, the inflated left closure set is built using the same approach as the inflated right closure set, with the initial directed way being inverted. For example, the inflated left closure set is built by relaxing the vertex corresponding to (W, not W_direction) and the inflated right closure set is built by relaxing the vertex corresponding to (W, W_direction). By symmetry, the inflated right closure set of an inverted way is the inflated left closure set of the non-inverted way. Similarly, the inflated left closure set of an inverted way is the inflated right closure set of the non-inverted way.

At block 400, the inflated left and right closure sets are transferred to the target graph based on the left and right anchor nodes. For example, the apparatus 10 may transfer the inflated closure sets to the target graph based on the anchor nodes. For example, the apparatus 10 may comprise means, such as the processor 12, the user interface 16, or the like for transferring the inflated closure sets to the target graph based on the anchor nodes. For example, each left/right anchor node of the left/right closure set may be identified in the target graph based on the junction identifier associated therewith. In various embodiments, the designation of an anchor node as a left or right anchor node may also be transferred to the target graph. In an example embodiment, only the anchor nodes of the inflated left and right closure sets (and possibly the left or right anchor node designations thereof) are transferred to the target graph.

Figure 8A:
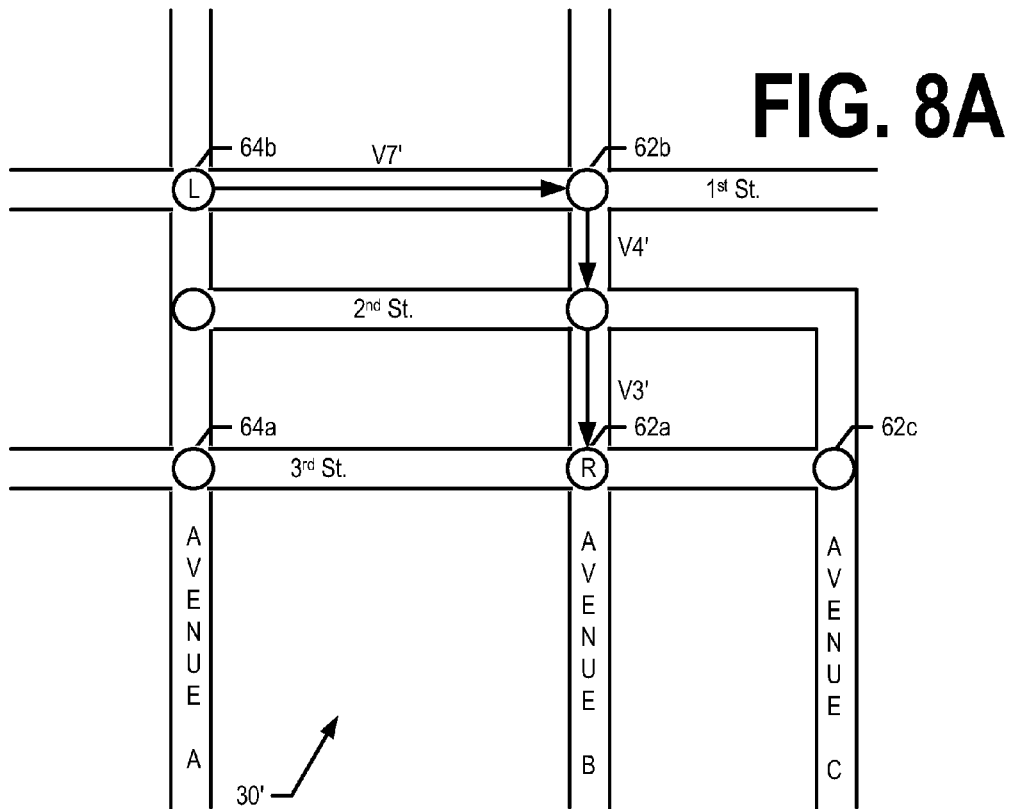
Figure 8B:
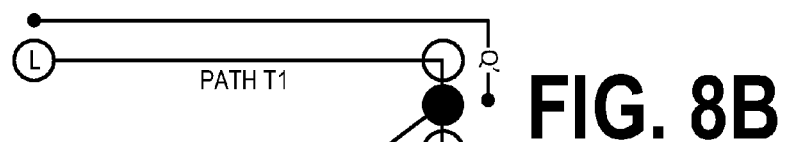
Figure 8C:
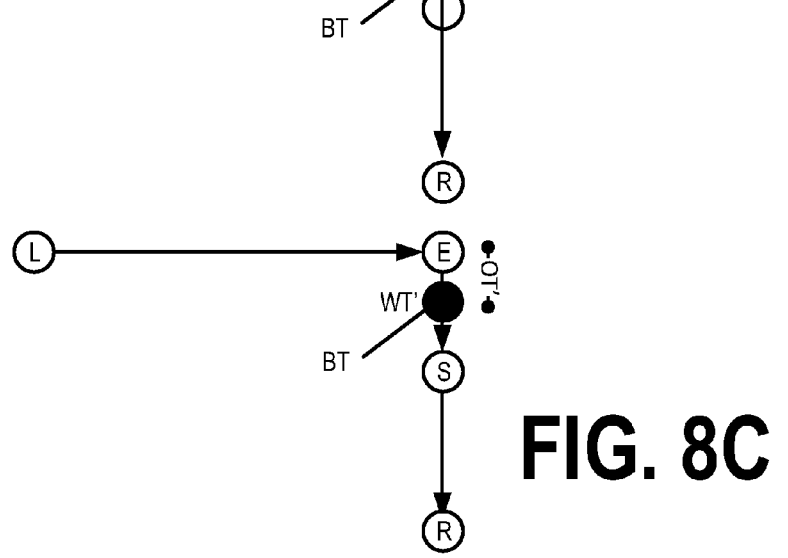

Continuing to block 500, the inflated left and right closure sets in the target graph are deflated to identify and/or determine the object B in the target graph. For example, the apparatus 10 may deflate the inflated closure sets in the target graph to identify and/or determine the object in the target graph. For example, the apparatus 10 may comprise means, such as the processor 12, the user interface 16, or the like for deflating the closure sets in the target graph to identify and/or determine the object in the target graph. In an example embodiment, a set {T} comprising a plurality of shortest paths $T_i$ from left anchor nodes to right anchor nodes are identified, constructed, and/or determined. An object $B_T$ is computed, identified and/or determined along each path $T_i$. A descriptor of the quality of the mapping of object A to object B is computed and/or determined to identify and/or determine the $B_T$ having the highest quality mapping. In such example embodiments, the $B_T$ having the highest quality mapping is selected, identified, or determined to be the mapping of object A in the source graph into object B in the target graph. For example, FIGS. 8C and 9C show an object $B_T$ identified along two different paths $T_i$. The descriptor of the quality of the mapping of object A to the objects $B_T$ indicates that the object $B_T$ shown in FIG. 9C is a better quality mapping of the object A into the target graph 30' and should therefore be selected as the mapping of object A into the target graph. An example method of deflating the closure sets in the target graph to identify and/or determine the object B in the target graph is described in more detail below.

As indicated above, in example embodiments, the object A in the source graph 30 may be identified by a directed way (W, W_direction) and an offset O along the directed way (W, W_direction) in the source graph. In such embodiments, the object B in the target graph may be similarly identified by a directed way (W', W'_direction) and an offset O' along the directed way (W', W'_direction) in the target graph 30', as shown in FIGS. 9A, 9B, and 9C.

At block 600, a consistency check of object B in the target graph is performed. For example, the apparatus 10 may perform a consistency check of object B in the target graph. For example, the apparatus 10 may comprise means, such as the processor 12, the user interface 16, or the like for performing a consistency check of object B in the target graph. For example, in various embodiments, the object B in the target graph may be mapped back into the source graph. For example, the object B in the target graph may be mapped to object C in the source graph by defining closure graph around the object B, building inflated right and left the closure sets, transferring the anchor nodes of the closure sets to the source graph, and deflating the closure sets in the source graph to identify object C. The distance between object A and object C in the source graph may then be computed and/or determined. In an example embodiment, the Euclidean distance between object A and object C is computed and/or determined. It is then determined if the distance between object A and object C is less than and/or approximately equal to a consistency check threshold. For example, in an example embodiment, the consistency check threshold is one meter and it is determined if the Euclidean distance between object A and object C is greater than one meter. If the distance between object A and object C is not greater than the consistency check threshold, then the mapping of object A to object B is determined to be an acceptable mapping. If the distance between object A and object C is greater than the consistency check threshold, then the mapping of object A to object B is determined to not be an acceptable mapping and an error or no match message may be returned. In some embodiments, a consistency check is not performed.

At block 700, the object B in the target graph is returned and/or provided. For example, the apparatus 10 may return and/or provide the object B in the target graph. For example, the apparatus 10 may comprise means, such as the processor 12, the user interface 16, the communications interface 18, or the like for returning and/or providing the object B in the target graph. For example, the processor 12 may cause the object B to be displayed on a map displayed via the user interface 16.

A. Example of Defining a Closure Graph

FIG. 3 provides a flowchart illustrating various operations and procedures that may be completed in accordance with an example embodiment of the present invention to define a closure graph based on the source graph. Starting at block 202, two vertices are defined. One of the vertices corresponds to the directed way (W, W_direction) and the other vertex corresponds to the directed way (W, not W_direction) for each possible way W in the source map. For example, the apparatus 10 may define a vertex corresponding to the directed way (W, W_direction) and define another vertex corresponding to the directed way (W, not W_direction). For example, the apparatus 10 may comprise means, such as the processor 12 or the like for defining a vertex corresponding to directed way (W, W_direction) and defining another vertex corresponding to directed way (W, not W_direction). At block 204, a set of directed ways having the end node of (W, W_direction) as their start node is built. This set will be used for the algorithm during closure inflation to determine the outgoing edges for (W, W_direction). For example, the apparatus 10 may build a set of directed ways having the end node of (W, W_direction) as their start node. For example, the apparatus 10 may comprise means, such as the processor 12 or the like for building a set of directed ways having the end node of (W, W_direction) as their start node. For example, all of the directed ways having a start node at end node E are identified. For example, for the source graph 30 shown in FIG. 2, the ways Ave. B from $2^{nd}$ St. to $3^{rd}$ St.; Ave. B from $2^{nd}$ St. to $1^{st}$ St.; $2^{nd}$ St from Ave. B to Ave. C; and $2^{nd}$ St. from Ave. A to Ave. B are all of the directed ways having the end node E as a start node. The identified directed ways comprise the elements of a set of the directed ways having a start node at end node E.

At block 206 it is determined if the set of directed ways having the end node E of directed way (W, W_direction) consists of more than one unique element, or directed way. For example, the apparatus 10 may determine if the set comprises more than one unique directed way. For example, the apparatus 10 may comprise means, such as the processor 12 or the like for determining if the set consists of more than one unique directed way. If it is determined at block 206 that the set only consists of one unique directed way, that directed way is the reverse of the directed way (W, W_direction) (a.k.a., (W, not W_direction)) and the process continues to block 210. If it is determined at block 206 that the set comprises more than one unique directed way, or possibly in response thereto, the directed way (W, not W_direction) is removed from the set at block 208. For example, the apparatus 10 may remove the directed way (W, not W_direction) from the set. For example, the apparatus 10 may comprise means, such as the processor 12 or the like for removing the directed way (W, not W_direction) from the set. In particular, if the directed way (W, not W_direction) is the only unique way in the set, then the end node E of directed way (W, W_direction) is a dead end or way without an outlet (e.g., a cul-de-sac or the like). If the end node E is not a no outlet node (e.g., the end node E is not a cul-de-sac, dead end, or the like) including (W, not W_direction) in the set of edges to be added to the vertex corresponding to (W, W_direction) may lead to unnecessary and/or duplicative calculations being completed.

At block 210, all of the ways in the set of directed ways having the end node E as a start node are added as an edge to the vertex corresponding to (W, W_direction). For example, the apparatus 10 may add all of the ways in the set of directed ways having the end node E as a start node as an edge of the vertex corresponding to (W, W_direction). For example, the apparatus 10 may comprise means, such as the processor 12 or the like for adding all of the ways in the set of ways having the end node E as a start node as an edge of the vertex corresponding to (W, W_direction). For the example source graph 30 shown in FIG. 2, the vertex corresponding to (W, W_direction) may consist of edges corresponding to Ave. B from $2^{nd}$ St. to $3^{rd}$ St.; Ave. B from $2^{nd}$ St. to $1^{st}$ St.; and $2^{nd}$ St from Ave. B to Ave. C.

At block 212, a set of directed ways having the end node of (W, not W_direction) as their start node is built. For example, the apparatus 10 may build a set of directed ways having the end node of (W, not W_direction) as their start node. For example, the apparatus 10 may comprise means, such as the processor 12 or the like for building a set of directed ways having the end node of (W, not W_direction) as their start node. For example, all of the directed ways having a start node at end node S are identified. For example, for the source graph 30 shown in FIG. 2, the ways Ave. A from $2^{nd}$ St. to $3^{rd}$ St. and Ave. A from $2^{nd}$ St. to $1^{st}$ St. are all of the directed ways having the end node S as a start node. The identified directed ways comprise the elements of a set of the directed ways having a start node at end node S.

At block 214 it is determined if the set of directed ways having the end node S of directed way (W, not W_direction) consists of more than one unique element, or directed way. For example, the apparatus 10 may determine if the set comprises more than one unique directed way. For example, the apparatus 10 may comprise means, such as the processor 12 or the like for determining if the set consists of more than one unique directed way. If it is determined at block 214 that the set only consists of one unique directed way, that directed way is the reverse of the directed way (W, not W_direction) (a.k.a., (W, W_direction)) and the process continues to block 218. If it is determined at block 214 that the set comprises more than one unique directed way, or possibly in response thereto, the directed way (W, W_direction) is removed from the set at block 216. For example, the apparatus 10 may remove the directed way (W, W_direction) from the set. For example, the apparatus 10 may comprise means, such as the processor 12 or the like for removing the directed way (W, W_direction) from the set. In particular, if the directed way (W, W_direction) is the only unique way in the set, then the end node S of directed way (W, not W_direction) is a dead end or way without an outlet (e.g., a cul-de-sac or the like). If the end node S is not a no outlet node (e.g., the end node S is not a cul-de-sac, dead end, or the like) including (W, W_direction) in the set of edges to be added to the vertex corresponding to (W, not W_direction) may lead to unnecessary and/or duplicative calculations being completed.

At block 218, all of the ways in the set of directed ways having the end node S as a start node are added as an edge to the vertex corresponding to (W, not W_direction). For example, the apparatus 10 may add all of the ways in the set of directed ways having the end node S as a start node as an edge of the vertex corresponding to (W, not W_direction). For example, the apparatus 10 may comprise means, such as the processor 12 or the like for adding all of the ways in the set of ways having the end node S as a start node as an edge of the vertex corresponding to (W, not W_direction). For the example source graph 30 shown in FIG. 2, the vertex corresponding to (W, not W_direction) may consist of edges corresponding to Ave. A from $2^{nd}$ St. to $3^{rd}$ St. and Ave. A from $2^{nd}$ St. to $1^{st}$ St.

Thus, two vertices, one corresponding to (W, W_direction) and one corresponding to (W, not W_direction) comprise edges corresponding to directed ways starting at the end nodes of the respective directed ways (W, W_direction) and (W, not W_direction). Thus, in general, the closure graph is an inverted graph in the vicinity of the object A based on the map information/data of the source graph. The closure graph may then be used build an inflated closure set around object A. An example method that may be used to inflate the closure set in the source graph is described in more detail below.

B. Example of Building a Right Closure Set

FIG. 5 provides a flowchart illustrating various operations and procedures that may completed in accordance with an example embodiment of the present invention to build an inflated right closure set. Starting at block 302, an unvisited outgoing edge of the vertex corresponding to (W, W_direction) is selected. For example, the apparatus 10 may select an unvisited outgoing edge of the vertex corresponding to (W, W_direction). For example, the apparatus 10 may comprise means, such as the processor 12, the user interface 16, or the like for selecting an unvisited outgoing edge of the vertex corresponding to (W, W_direction). For example, as described above, the vertex corresponding to (W, W_direction) comprises a set of outgoing edges. In example embodiments, each of the edges of the vertex corresponding to (W, W_direction) are initial marked as unvisited and/or to be visited and are later marked as visited as the edge is visited. In general, the vertex is relaxed by applying a modified Dijkstra's algorithm. For example, the applied Dijkstra's algorithm may be modified such that the destination is set to unknown. In various embodiments, the next edge to be visited may be determined by applying the modified Dijkstra's algorithm. In general, Dijkstra's algorithm is a well-known algorithm for determining the shortest path between nodes in a graph. As noted, Dijkstra's algorithm may be modified in various embodiments of the present invention such that the destination of the algorithm is unknown and that the algorithm will terminate once an anchor node is reached.

At block 304, it may be determined if the end node of the currently visited edge is an anchor node. For example, the apparatus 10 may determine if the end node of the currently visited edge is an anchor node. For example, the apparatus 10 may comprise means, such as the processor 12 or the like for determining if the end node of the currently visited edge is an anchor node. For example, the map data/information of the source graph may be accessed to determine if the end node of the currently visited edge is an anchor node. For example, map data/information stored in the geographic database may be queried and/or otherwise accessed to determine if the end node of the currently visited edge is an anchor node. For example, it may be determined that the end node of the currently visited edge is tagged with a junction identifier and based thereon determine that the end node of the currently visited edge is an anchor node.

If it is determined at block 304 that the end node of the currently visited edge is not an anchor node, the process continues to block 306. At block 306, the currently visited edge is marked as visited and edges corresponding to all of the directed ways outgoing from the end node of the currently visited edge are marked as unvisited edges. For example, the apparatus 10 may mark the currently visited edge as visited and mark the edges corresponding to all of the directed ways outgoing from the end node of the currently visited edge as unvisited edges. For example, the apparatus 10 may comprise means, such as the processor 12 or the like for marking the currently visited edge as visited and marking the edges corresponding to all of the directed ways outgoing from the end node of the currently visited edge as unvisited edges. Edges corresponding to all of the directed ways outgoing from the end node of the currently visited edge may be marked as unvisited (e.g., added to the vertex corresponding to (W, W_direction) as unvisited edges) such that each of those edges will be visited. The process then returns to block 302, where the modified Dijkstra's algorithm continues to be applied to select an unvisited edge (e.g., an edge of the vertex corresponding to (W, W_direction) that is marked as unvisited).

If it is determined at block 304 that the end node of the currently visited edge is an anchor node, the process continues to block 308. At block 308, the path from the directed way (W, W_direction) to the identified anchor node (the end node of the currently visited edge which is an anchor node) and/or the cost (e.g., the length and/or a representation of the length of the path from the directed way (W, W_direction) to the identified anchor node) is added to the right closure set. For example, the apparatus 10 may add the path from the directed way (W, W_direction) to the identified anchor node and/or the corresponding cost to the right closure set. For example, the apparatus 10 may comprise means, such as the processor 12 or the like for adding the path from the directed way (W, W_direction) to the identified anchor node and/or the corresponding cost to the right closure set.

At block 310, the currently visited edge is marked as visited and no outgoing edges corresponding to directed ways outgoing from the anchor node are marked to be visited. For example, the apparatus 10 may mark the currently visited edge as visited and does not mark the outgoing edges corresponding to directed ways outgoing from the anchor node as unvisited (e.g., they are not marked that they should be visited). For example, the apparatus 10 may comprise means, such as the processor 12 or the like for marking the currently visited edge as visited and for not marking the outgoing edges corresponding to directed ways outgoing from the anchor node as unvisited (e.g., they are not marked that they should be visited). For example, each path of the right closure set ends at an anchor node with no anchor nodes located in the middle of the path (e.g., between the directed way (W, W_direction) and the anchor node at the end of the path). Therefore, no outgoing edges corresponding to a directed way outgoing from an anchor node are visited.

At block 312, it is determined if there are any edges left marked as "to be visited". For example, the apparatus 10 may determine if all edges marked as "to be visited" are marked as visited. For example, the apparatus 10 may comprise means, such as the processor 12 or the like for determining if all edges marked as "to be visited" are marked as visited. If, at block 312, it is determined that not all edges marked as "to be visited", the process then returns to block 302, where the modified Dijkstra's algorithm continues to be applied to select an unvisited edge. If, at block 312, it is determined that all edges that were marked "to be visited" have been visited, the process continues to block 314.

The process ends at block 314. In particular, upon reaching block 314, the inflated right closure set has been built. Thus, the inflated right closure set comprises one or more paths from directed way (W, W_direction) to right anchor nodes and/or the corresponding cost of each path (e.g., the length of each path and/or a representation of the length of each path). As noted above, to build the inflated left closure set, the same process is undertaken, but the vertex corresponding to directed way (W, not W_direction) is used. In an example embodiment, the path to an anchor node along two or more ways of the pre-inflation closure set may be explored in parallel.

FIGS. 6A and 6B illustrate an example of building an inflated right closure set. FIG. 6A shows a set of directed ways. The solid lines indicate directed ways for which corresponding edges were visited during the building of the inflated right closure set and dashed lines indicate directed ways for which corresponding edges were not visited during the building of the inflated right closure set. The circles denote anchor nodes. FIG. 6B is a diagram illustrating paths that are added to the inflated right closure set.

For example, unvisited directed way ($V_A$, A_dir) is selected and visited. The end node of directed way ($V_A$, A_dir), node 1, is not an anchor node, so each outgoing edge from node 1 is visited. The only outgoing edge from node 1 corresponds to directed way ($V_B$, B_dir). When directed way ($V_B$, B_dir) is visited, it is found that the end node of directed way ($V_B$, B_dir), node 2, is an anchor node. Therefore, no edges outgoing from node 2 are visited and the path from the directed way (W, W_direction) to node 2 is added to the inflated right closure set, as shown in FIG. 6B. For example, the path (W, W_direction)+($V_A$, A_dir)+($V_B$, B_dir) is added to the right closure set.

Returning to FIG. 6A, another unvisited edge is then selected from the vertex corresponding to (W, W_direction). For example, the unvisited directed way ($V_C$, C_dir) is selected and visited. The end node of directed way ($V_C$, C_dir), node 3 is not an anchor node, so the edges corresponding to directed ways outgoing from node 3 are marked as unvisited, to be visited, and/or the like. In this example, unvisited directed way ($V_D$, D_dir) is visited next. The end node of directed way ($V_D$, D_dir), node 4, is an anchor node. Thus, no edges outgoing from node 4 are visited and the path from the directed way (W, W_direction) to node 4 is added to the inflated right closure set, as shown in FIG. 6B. For example, the path (W, W_direction)+($V_C$, C_dir)+($V_D$, D_dir) is added to the right closure set.

Next, according to the present example, directed way ($V_E$, E_dir) is selected and visited. The end node of directed way ($V_E$, E_dir), node 5, is not an anchor node, so all edges corresponding to directed ways outgoing from node 5 (e.g., ($V_F$, F_dir) and ($V_G$, G_dir)) are identified and marked as unvisited and/or to be visited. Directed way ($V_F$, F_dir) is selected and visited next. It is determined that the end node of ($V_F$, F_dir), node 6, is an anchor node. Therefore, no edges outgoing from node 6 are visited and the path from the directed way (W, W_direction) to node 6 is added to the inflated right closure set, as shown in FIG. 6B. For example, the path (W, W_direction)+($V_C$, C_dir)+($V_D$, D_dir)+($V_F$, F_dir) is added to the right closure set.

As there is still an edge of the vertex corresponding to (W, W_direction) that is still marked as unvisited (e.g., the edge corresponding to directed way ($V_G$, G_dir)), the process continues. In particular, the edge corresponding to directed way ($V_G$, G_dir) is selected and visited. It is determined that the end node of directed way ($V_G$, G_dir), node 1, is not an anchor node. Moreover, there are no unvisited edges of node 1 remaining. It is therefore determined that a path to an anchor node (node 6) may be reached via directed way ($V_G$, G_dir), a shorter path to this anchor node is already known and has already been added to the inflated right closure set. As there are no other edges marked as un-visited and/or to be visited, the inflation of the right closure set is now complete.

C. Example of Deflating a Closure Set

FIG. 7 provides a flowchart illustrating various operations and procedures that may be completed in accordance with an example embodiment of the present invention to deflate the left and right closure sets within the target graph. In particular, as described above, the anchor nodes of the inflated closure sets may be identified in the target graph. The closure sets may then be deflated to identify the object in the target graph. To deflate or reduce the closure sets from the anchor nodes of the inflated closure sets to the object in the target graph, the shortest path between each left and right anchor node pair is investigated. In particular, starting at block 502, a left and right anchor node pair that has not yet been checked is selected. For example, the apparatus 10 may select a left and right anchor node pair that has not been check yet. For example, the apparatus 10 may comprise means, such as processor 12, user interface 16, communications interface 18, or the like, for selecting a left and right anchor node pair that has not yet been checked.

At block 504, the path from the selected left anchor node to the selected right anchor node through the way (W, W_direction) in the source graph is defined as path S. For example, the apparatus 10 may define the path S from the selected left anchor node to the selected right anchor node through the way (W, W_direction) in the source graph. For example, the apparatus 10 may comprise means, such as the processor 12, user interface 16, communications interface 18, or the like for defining the path S from the selected left anchor node to the selected right anchor node through the way (W, W_direction) in the source graph. For example, path S is defined as the concatenation of (VL, VL_direction); (W, W_direction); and (VR, VR_direction). For example, if the selected left anchor node is anchor node 64*b* and the selected right anchor node is 62*a*, the path S is (V2, false) concatenated with (W, W_direction) concatenated with (V3, false), as shown in FIG. 4.

At block 506, a set {T} of shortest paths from the selected left anchor node to the selected right anchor node is built in the target graph. For example, the apparatus 10 may build a set {T} of shortest paths from the selected left anchor node to the selected right anchor node in the target graph. For example, the apparatus 10 may comprise means, such as the processor 12, user interface 16, communications interface 18, or the like for building a set {T} of shortest paths from the selected left anchor node to the selected right anchor node in the target graph. For example, Dijkstra's algorithm may be used to determine a shortest path to the right anchor node for each outgoing vertex from the selected left anchor node in the target graph. For example, left anchor node 64*b* in example target graph 30' has four outgoing vertices, thus the set {T} of shortest paths from left anchor node 64*b* to right anchor node 62*a* will have four elements. Two paths $T_i$ of the set {T} of shortest paths from the left anchor node 64*b* to right anchor node 62*a* in example target graph 30' are shown in FIGS. 8A and 9A.

At block 508, a path $T_i$ is selected from the set {T} of shortest paths from the selected left anchor node to the selected right anchor node in the target graph. For example, the apparatus 10 may select a path $T_i$ from the set {T} of shortest paths from the selected left anchor node to the selected right anchor node in the target graph. For example, the apparatus 10 may comprise means, such as processor 12, user interface 16, communications interface 18, or the like, for selecting a path $T_i$ from the set {T} of shortest paths from the selected left anchor node to the selected right anchor node in the target graph. For example, the path $T_1$ shown in FIG. 8B or the path $T_2$ shown in FIG. 9B may be selected.

Returning to FIG. 7, at block 510, it is determined if the length of path $T_i$ is greater than the length of path S plus a distance threshold. For example, the apparatus 10 may determine if the length of path $T_i$ is greater than the length of path S plus a distance threshold. For example, the apparatus 10 may comprise means, such as processor 12, user interface 16, communications interface 18, or the like, for determining if the length of path $T_i$ is greater than the length of path S plus a distance threshold. For example, the length of path $T_i$ may be computed and/or determined and compared against the length of path S plus a distance threshold to determine if the length of path $T_i$ is greater than the length of path S plus a distance threshold. In an example embodiment, the distance threshold is 100 m. In an example embodiment, a threshold length for the left and right anchor node pair is defined. In such example embodiment, the threshold length is defined as the length of the path S plus the distance threshold.

If, at block 510, it is determined that the length of path $T_i$ is greater than the length of path S plus the distance threshold, then the process continues to block 512. At block 512, the path $T_i$ is removed from the set {T} of shortest paths from the selected left anchor node to the selected right anchor node in the target graph or otherwise removed from further consideration. For example, the apparatus 10 may remove the path $T_i$ from the path {T} or otherwise remove the path $T_i$ from further consideration. For example, the apparatus 10 may comprise means, such as processor 12, user interface 16, communications interface 18, or the like, for removing the path $T_i$ from the path {T} or otherwise removing the path $T_i$ from further consideration.

If, at block 510, it is determined that the length of path $T_i$ is not greater than the length of path S plus the distance threshold, then the process continues to block 514. At block 514, the relative position Q along path $T_i$ is computed and/or determined. For example, the apparatus 10 may compute and/or determine the relative position Q along path $T_i$. For example, the apparatus 10 may comprise means, such as processor 12, the user interface 16, the communications interface 18, or the like, for computing and/or determining the relative position Q along the path $T_i$. For example, the relative position Q along path $T_i$ may be computed as the length of VL+the offset O all divided by the length of path S. For example, Q=(length(VL)+O)/length(S). For example, if the relative position Q is 0, then the relative position on the path $T_i$ is the starting point of the path $T_i$ (e.g., the selected left anchor node). In another example, if the relative position Q is 0.5, then the relative position along the path $T_i$ is half way between the starting point and the ending point of the path $T_i$ (e.g., halfway between the selected left anchor node and the right anchor node along the path $T_i$). In some embodiments, the relative position Q is computed and/or determined when the path S is defined (e.g., block 514 would be completed directly after block 504). For example, in some embodiments, the relative position Q is the same for all paths of the set {T} for a particular left and right anchor node pair. FIGS. 8B and 9B each illustrate a different path $T_i$ of the set $\{T\}$ and the relative position Q along the path.

Continuing to block 516, as shown in FIG. 7, the offset $O_T'$ is computed and/or determined. For example, the apparatus 10 may compute and/or determine the offset $O_T'$. For example, the apparatus 10 may comprise means, such as processor 12, the user interface 16, the communications interface 18, or the like, for computing and/or determining the offset $O_T'$. For example, it may be determined which directed way ($W_T'$, $W_T'\_direction$) along the path $T_i$ to which the relative position Q corresponds. In an example embodiment, it may then be determined what offset $O_T'$ along the directed way ($W_T'$, $W_T'\_direction$) corresponds to the object indicated by the relative position Q. Thus, a candidate object $B_T$ in the target graph is identified as being located along directed way ($W_T'$, $W_T'\_direction$) at offset $O_T'$. FIGS. 8C and 9C illustrate determining offset $O_T'$ along the directed way ($W_T'$, $W_T'\_direction$) and identifying the candidate object $B_T$ in the target graph 30'.

At block 518, as shown in FIG. 7, the descriptor of the mapping quality for the path $T_i$ is computed and/or determined. For example, the apparatus 10 may compute and/or determine the descriptor of the mapping quality for the path $T_i$. For example, the apparatus 10 may comprise means, such as processor 12, the user interface 16, the communications interface 18, or the like, for computing and/or determining the descriptor of the mapping quality for the path $T_i$. In some embodiments, the descriptor of the mapping quality is the penalty for the path described in more detail below. In an example embodiment, the smaller the penalty associated with the path $T_i$ the better the quality of a mapping between the object A in the source graph 30 and the corresponding object B in the target graph 30'. Various descriptors of the mapping quality may be used to rank, quantify, indicate, and/or describe the quality of the mapping between the object A in the source graph 30 and the corresponding object B in the target graph 30'.

At block 520, it is determined if all of the paths $T_i$ corresponding to the selected left and right anchor node pair have been checked. For example, the apparatus 10 may determine if all the paths $T_i$ corresponding to the selected left and right anchor node pair have been checked. For example, the apparatus 10 may comprise means, such as processor 12, the user interface 16, the communications interface 18, or the like, for determining if all the paths $T_i$ corresponding to the selected left and right anchor node pair have been checked. If it is determined that there are still one or more paths $T_i$ that have not been checked, then the process returns to block 508 to select another path $T_i$. If it is determined that all of the paths $T_i$ corresponding to the selected left and right anchor node have been checked, then the process continues to block 522.

At block 522 it is determined if all the left and right anchor node pairs have been checked and/or considered. For example, the apparatus 10 may determine if all the left and right anchor node pairs have been checked and/or considered. For example, the apparatus 10 may comprise means, such as processor 12, the user interface 16, the communications interface 18, or the like, for determining if all the left and right anchor node pairs have been checked and/or considered. If there are one or more left anchor node and right anchor node pairs that have not been checked and/or considered, the process returns to block 502 and an unchecked left and right anchor node pair is selected. If all of the left and right anchor node pairs have been checked and/or considered, the process continues to block 524.

At block 524, the candidate object B in the target graph 30' corresponding to the path with the descriptor of the mapping quality indicating the highest quality mapping (e.g., the lowest penalty) is returned as the mapping of the object in the source graph into the target graph. For example, the apparatus 10 may return the candidate object in the target graph corresponding to the path with the descriptor of the mapping quality indicating the highest quality mapping (e.g., the lowest penalty) as the mapping of the object in the source graph into the target graph. For example, the apparatus 10 may comprise means, such as processor 12, the user interface 16, the communications interface 18, or the like, for returning the candidate object in the target graph corresponding to the path with the descriptor of the mapping quality indicating the highest quality mapping (e.g., the lowest penalty) as the mapping of the object in the source graph into the target graph. For example, it may be determined which path $T_i$ is associated with the descriptor of the mapping quality indicating the highest quality mapping (e.g., the lowest penalty). The corresponding directed way ($W_T'$, $W_T'\_direction$) and offset $O_T'$ corresponding to the path having the descriptor of the mapping quality indicating the highest quality mapping (e.g., the lowest penalty) may then be returned as identifying the object B in the target graph 30'.

D. Example Descriptor of Quality of a Mapping

FIG. 10 provides a flowchart illustrating various operations and procedures that may completed in accordance with an example embodiment of the present invention to compute and/or determine the quality of a mapping for a path $T_i$. In particular, FIG. 10 provides a flowchart illustrating various operations and procedures that may completed to compute and/or determine a penalty for a path $T_i$ that indicates the quality of the mapping of the candidate object $B_T$. In example embodiments, a lower penalty for a path $T_i$ corresponds to a higher quality mapping between the object A identified as offset O along directed way (W, W_direction) in the source graph 30 and object $B_T$ identified as offset $O_T'$ along the directed way ($W_T'$, $W_T'\_direction$) in the target graph 30'.

Starting at block 650, the distance between object A in the source graph and object $B_T$ in the target graph is computed and/or determined and the distance is set as the penalty corresponding to object $B_T$. For example, the apparatus 10 may compute and/or determine the distance between object A in the source graph and object $B_T$ in the target graph and may set the value of the penalty corresponding to the object $B_T$ equal to the distance. For example, the apparatus 10 may comprise means, such as processor 12, the user interface 16, the communications interface 18, or the like, for computing and/or determining the distance between object A in the source graph and object $B_T$ in the target graph and setting the value of the penalty corresponding to the object $B_T$ equal to the distance. In an example embodiment, the Euclidean distance between the object A in the source graph and the object $B_T$ in the target graph is computed and/or determined. In the example embodiment, the penalty corresponding to the object $B_T$ is set equal to the computed and/or determined Euclidean distance.

At block 652, it is determined if the penalty corresponding to the object $B_T$ is greater than a threshold penalty. For example, the apparatus 10 may determine if the penalty corresponding to the object $B_T$ is greater than a threshold penalty. For example, the apparatus 10 may comprise means, such as processor 12, the user interface 16, the communications interface 18, or the like, for determining if the penalty corresponding to the object $B_T$ is greater than a threshold penalty. In an example embodiment, the threshold penalty may be 15 meters.

If it is determined at block 652 that the penalty corresponding to the object $B_T$ is greater than a threshold penalty, the process may continue to block 654. At block 654, the object $B_T$ is removed from consideration. For example, the apparatus 10 may remove the object $B_T$ from consideration. For example, the apparatus 10 may comprise means, such as processor 12, the user interface 16, the communications interface 18, or the like, for removing the object $B_T$ from consideration. For example, the path $T_i$ corresponding to the object $B_T$ may be removed from the set $\{T\}$, the penalty corresponding to the object $B_T$ may be set to a very large number and/or infinity and determination of the penalty may be ended, and/or the like.

If it is determined at block 652 that the penalty corresponding to the object $B_T$ is greater than a threshold penalty, the process may continue to block 656. At block 656, the distance between a point located at ⅓ of the way along path S in the source graph 30 and a point located at ⅓ of the way along path $T_i$ in the target graph 30' is computed and/or determined. The computed/determined distance is then added to the penalty corresponding to the path $T_i$. For example, the apparatus 10 may compute and/or determine the distance between a point located at ⅓ of the way along path S and a point located at ⅓ of the way along path $T_i$ and add the computed/determined distance to the penalty corresponding to the path $T_i$. For example, the apparatus 10 may comprise means, such as processor 12, the user interface 16, the communications interface 18, or the like, for computing and/or determining the distance between a point located at ⅓ of the way along path S and a point located at ⅓ of the way along path $T_i$ and adding the computed/determined distance to the penalty corresponding to the path $T_i$. In an example embodiment, the Euclidean distance between a point located at a relative position of ⅓ along path S and a point located at a relative position of ⅓ along path $T_i$ is computed and/or determined. In the example embodiment, the Euclidean distance between the two noted points is added to the penalty corresponding to the path $T_i$.

At block 658 it is determined if the distance computed/determined at block 656 is greater than the penalty threshold. For example, the apparatus 10 may determine if the distance computed/determined at block 656 is greater than the penalty threshold. For example, the apparatus 10 may comprise means, such as processor 12, the user interface 16, the communications interface 18, or the like, for determining if the distance computed/determined at block 656 is greater than the penalty threshold. In an example embodiment, the threshold penalty may be 15 meters. In some embodiments, it is determined if the updated penalty corresponding to the path $T_i$ is greater than the threshold penalty, greater than two times the threshold penalty, and/or the like.

If at block 658 it is determined that the distance computed/determined at block 656 is greater than the penalty threshold, the process may continue to block 660. At block 660, the object $B_T$ is removed from consideration. For example, the apparatus 10 may remove the object $B_T$ from consideration. For example, the apparatus 10 may comprise means, such as processor 12, the user interface 16, the communications interface 18, or the like, for removing the object $B_T$ from consideration. For example, the path $T_i$ corresponding to the object $B_T$ may be removed from the set $\{T\}$, the penalty corresponding to the object $B_T$ may be set to a very large number and/or infinity and determination of the penalty corresponding to the path $T_i$ may be ended, and/or the like.

If at block 658 it is determined that the distance computed/determined at block 656 is not greater than the penalty threshold, the process may continue to block 662. At block 662, the distance between a point located at ⅔ of the way along path S in the source graph 30 and a point located at ⅔ of the way along path $T_i$ in the target graph 30' is computed and/or determined. The computed/determined distance is then added to the penalty corresponding to the path $T_i$. For example, the apparatus 10 may compute and/or determine the distance between a point located at ⅔ of the way along path S and a point located at ⅔ of the way along path $T_i$ and add the computed/determined distance to the penalty corresponding to the path $T_i$. For example, the apparatus 10 may comprise means, such as processor 12, the user interface 16, the communications interface 18, or the like, for computing and/or determining the distance between a point located at ⅔ of the way along path S and a point located at ⅔ of the way along path $T_i$ and adding the computed/determined distance to the penalty corresponding to the path $T_i$. In an example embodiment, the Euclidean distance between a point located at a relative position of ⅔ along path S and a point located at a relative position of ⅔ along path $T_i$ is computed and/or determined. In the example embodiment, the Euclidean distance between the two noted points is added to the penalty corresponding to the path $T_i$.

At block 664 it is determined if the distance computed/determined at block 662 is greater than the penalty threshold. For example, the apparatus 10 may determine if the distance computed/determined at block 662 is greater than the penalty threshold. For example, the apparatus 10 may comprise means, such as processor 12, the user interface 16, the communications interface 18, or the like, for determining if the distance computed/determined at block 662 is greater than the penalty threshold. In an example embodiment, the threshold penalty may be 15 meters. In some embodiments, it is determined if the updated penalty corresponding to the path $T_i$ is greater than the threshold penalty, greater than three times the threshold penalty, and/or the like.

If at block 664 it is determined that the distance computed/determined at block 662 is greater than the penalty threshold, the process may continue to block 666. At block 666, the object $B_T$ is removed from consideration. For example, the apparatus 10 may remove the object $B_T$ from consideration. For example, the apparatus 10 may comprise means, such as processor 12, the user interface 16, the communications interface 18, or the like, for removing the object $B_T$ from consideration. For example, the path $T_i$ corresponding to the object $B_T$ may be removed from the set $\{T\}$, the penalty corresponding to the object $B_T$ may be set to a very large number and/or infinity and determination of the penalty corresponding to the path $T_i$ may be ended, and/or the like.

If at block 664 it is determined that the distance computed/determined at block 662 is not greater than the penalty threshold, the process may continue to block 668. At block 668, it is determined if the direction $W_T'$ direction is allowed. For example, the object $B_T$ in the target graph 30' is identified as an offset $O_T'$ along a directed way ($W_T'$, $W_T'$_direction). In various scenarios, the map information/data stored in the geographic database may indicate that $W_T'$ is a one way road, is closed in one direction due to construction or an accident, and/or the like. Thus, if traffic is not allowed to pass along way $W_T'$ in the direction $W_T'$ direction, then the direction $W_T'$_direction is not allowed.

For example, the apparatus 10 may determine if the direction $W_T{'}\_direction$ is allowed. For example, the apparatus 10 may comprise means, such as processor 12, the user interface 16, the communications interface 18, or the like, for determining if the direction $W_T{'}\_direction$ is allowed. For example, map information/data stored in the geographic database may be accessed to determine if the direction $W_T{'}\_direction$ is allowed.

If at block 668 it is determined that the direction $W_T{'}\_direction$ is not allowed, the process continues to block 670. At block 670, a wrong direction penalty is added to the penalty corresponding to the path $T_i$. For example, the apparatus 10 may add a wrong direction penalty to the penalty corresponding to the path $T_i$. For example, the apparatus 10 may comprise means, such as processor 12, the user interface 16, the communications interface 18, or the like, for adding a wrong direction penalty to the penalty corresponding to the path $T_i$. In an example embodiment, the wrong direction penalty is 10 meters.

At block 672 the penalty corresponding to the path $T_i$ is returned. For example, the apparatus 10 may return the penalty corresponding to the path $T_i$. For example, For example, the apparatus 10 may comprise means, such as processor 12, the user interface 16, the communications interface 18, or the like, for returning the penalty corresponding to the path $T_i$. For example, the penalty corresponding to the path $T_i$ may be stored (e.g., in association with information/data corresponding to path $T_i$) such that when the penalties corresponding to the other paths $T_j$ have been determined, the penalties corresponding to each path may be accessed such that the path having the lowest penalty may be determined.

By comparing FIGS. 2, 8C, and 9C, it is clear that the $B_T$ corresponding to path $T_2$ is a higher quality mapping of object A from the source graph to the target graph. These three figures also clearly show that the penalty corresponding to path $T_2$ is lower than the penalty corresponding to path $T_1$, even if the lengths of paths $T_1$ and $T_2$ are similar. Thus, the $B_T$ corresponding to path $T_2$ would be selected as the higher quality of mapping of object A from the source graph 30 to the target graph 30'.

III. Mapping a Linear Object from the Source Graph into the Target Graph

FIG. 11 provides a flowchart illustrating various operations and procedures that may be completed in accordance with an example embodiment of the present invention to map a linear object in the source graph into a linear object in the target graph. For example, a navigation path or route from a start location to an end location, such as that shown in FIG. 12, may be a linear object. In an example embodiment, the linear object may be identified by a vector of directed ways with an offset along the first way corresponding to the start location and an offset along the last way corresponding to the end location. In an example embodiment, the linear object may be identified by a start point object corresponding to the start location, such as start point object F, an end point object corresponding to the end location, such as end point object G, and a vector of directed ways providing a path through the graph from the start location to the end location. In an example embodiment, the start point object and the end point object in the source graph are mapped into corresponding point objects in the target graph. In such an embodiment, the vector of directed ways from the start location to the end location are determined in the target graph based on the directed ways on which the start point object and the end point object are located in the target graph. In an example embodiment, one or more point objects corresponding to midway points along the path represented by the vector of directed ways, such as midway point objects H and I, may also be mapped from the source graph into corresponding point objects in the target graph.

With reference to FIG. 11, starting at block 902, the start point object in the source graph is mapped into a corresponding start point object in the target graph. For example, the apparatus 10 may map the start point object in the source graph into a corresponding start point object in the target graph. For example, the apparatus 10 may comprise means, such as processor 12, the user interface 16, the communications interface 18, or the like, for mapping a start point object in the source graph into a corresponding start point object in the target graph. In an example embodiment, the start point object in the source graph may be mapped into a corresponding start point object in the target graph in the manner described above with respect to FIG. 1.

Continuing to block 904, the end point object in the source graph is mapped into a corresponding end point object in the target graph. For example, the apparatus 10 may map the end point object in the source graph into a corresponding end point object in the target graph. For example, the apparatus 10 may comprise means, such as processor 12, the user interface 16, the communications interface 18, or the like, for mapping an end point object in the source graph into a corresponding end point object in the target graph. In an example embodiment, the end point object in the source graph may be mapped into a corresponding end point object in the target graph in the manner described above with respect to FIG. 1.

At block 906, it is determined if the start point object and the end point object in the target graph are on the same way or directly connected ways. Two ways are directly connected in the target graph if the two ways share a node in the target graph. For example, ways W1 and W2 shown in FIG. 12 are directly connected. However, ways W1 and W4 are not directly connected. For example, the apparatus 10 may determine if the start point object and the end point object in the target graph are on the same way or directly connected ways. For example, the apparatus 10 may comprise means, such as processor 12, the user interface 16, the communications interface 18, or the like, for determining if the start point object and the end point object in the target graph are on the same way or directly connected ways.

Returning to FIG. 11, if at block 906 it is determined that the start point object and the end point object in the target graph are on the same way or directly connected ways, the process continues to block 908. At block 908, the linear object is returned in the target graph. For example, the linear object may be returned as a start point object, an end point object, and a vector of directed ways from the start point object to the end point object. For example, the apparatus 10 may return the linear object in the target graph. For example, the apparatus 10 may comprise means, such as processor 12, the user interface 16, the communications interface 18, or the like, for returning the linear object in the target graph.

If at block 906 it is determined that the start point object and the end point object in the target graph are not on the same way or directly connected ways, the process continues to block 910. At block 910, the vector from the start point object to the end point object in the source graph is split into two parts and a midway point object is defined at which the two parts of the split vector meet. For example, as shown in FIG. 12, point object F is the start point object and point object G is the end point object. In the target graph, point object F and point object G are not on the same or directly connected ways. Thus, the vector from point object F to point object G in the source graph is split into two parts and the midway point object H is defined at the point where the vector is split. In an example embodiment, the vector is split at a point that represents half the length of the vector. In one example embodiment, the vector is split such that the midway point object defined by the split is not on the same way as the start point object, end point object, or any midway point objects that have already been defined. For example, second midway point object I is defined such that it is not located on the same way as the start point object F, the first midway point object H, or the end point object G. For example, the apparatus 10 may split the vector from the start point object to the end point object in the source graph and define a midway point object in the source graph at which the two parts of the split vector meet. For example, the apparatus 10 may comprise means, such as processor 12, the user interface 16, the communications interface 18, or the like, for splitting the vector from the start point object to the end point object in the source graph and defining a midway point object in the source graph at which the two parts of the split vector meet.

With reference to FIG. 11, at block 912 the midway point object defined at block 910 may be mapped from the source graph into a corresponding midway point object in the target graph. For example, the apparatus 10 may map the midway point object in the source graph into a corresponding midway point object in the target graph. For example, the apparatus 10 may comprise means, such as processor 12, the user interface 16, the communications interface 18, or the like, for mapping a midway point object in the source graph into a corresponding midway point object in the target graph. In an example embodiment, the midway point object in the source graph may be mapped into a corresponding midway point object in the target graph in the manner described above with respect to FIG. 1.

At block 914, it is determined if the start point object and the midpoint object are located on directly connected ways and if the midway point object and the end point object are located on directly connected ways. For example, the apparatus 10 may determine if the start point object and the midpoint object are located on directly connected ways and if the midway point object and the end point object are located on directly connected ways. For example, the apparatus 10 may comprise means, such as processor 12, the user interface 16, the communications interface 18, or the like, for determining if the start point object and the midpoint object are located on directly connected ways and if the midway point object and the end point object are located on directly connected ways. Continuing with the example illustrated in FIG. 12, the start point F and the midway point H may be located on directly connected ways. However, the midway point H and the end point G are not located on the same or directly connected ways.

If, as with the example shown in FIG. 12, at least one of the start point object and the midway point object are not located on the same or directly connected ways or the midway point object and the end point object are not located on the same or directly connected ways, the process may return to block 910, as shown in FIG. 11. In an example embodiment, the second midway point object (or any subsequent midway point object) may be defined in the source graph by splitting the portion of the vector that corresponds to the two point objects that are not on directly connected ways. For example, as shown in FIG. 12, the second midway point object I is defined between the first midway point object H and the end point object G. There is no need to define a midway point object between the start point object F and the first midway point object H since they are located on directly connected ways. However, the first midway point object H and the end point object G are not located on directly connected ways, and therefore a second midway point object I is defined therebetween.

Further following the example shown in FIG. 12, the process continues to block 912 and second midway point object I is mapped from the source graph into a corresponding second midway point object in the target graph. The process then continues to block 914, where it is determined that the start point object F and the first midpoint object H are located on directly connected ways in the target graph, the first midway point object H and the second midway point object I are located on directly connected ways in the target graph, and the second midway point object I and the end point object G are located on directly connected ways in the target graph. Therefore, as shown in FIG. 11, the process continues to block 916.

At block 916, the results of mapping the start, end, and midway point objects into the target graph are concatenated into a vector from the start point object to the end point object in the target graph and the mapped linear object is returned. For example, the apparatus 10 may concatenate the results of mapping the start, end, and midway point objects into the target graph into a vector from the start point object to the end point object in the target graph and return the mapped linear object. For example, the apparatus 10 may comprise means, such as processor 12, the user interface 16, the communications interface 18, or the like, for concatenating the results of mapping the start, end, and midway point objects into the target graph into a vector from the start point object to the end point object in the target graph and returning the mapped linear object. For example, the mapped linear object comprises the start point object in the target graph, the end point object in the target graph, and the concatenated vector in the target graph. For the example shown in FIG. 12, after the start, end, and midway point objects F, G, H, and I are mapped into the target graph, the results comprise three linear objects. The first of the three linear objects comprises the start point object at offset $O_F'$ along directed way ($W_1'$, true), the first midway point object at offset $O_H'$ along directed way ($W_2'$, true) and a vector therebetween. The second of the three linear objects comprises the first midway point object at offset $O_H'$ along directed way ($W_2'$, true), the second midway point object at offset $O_I'$ along directed way ($W_3'$, true), and a vector therebetween. The third of the three linear objects comprises the second midway point object at offset $O_I'$ along directed way ($W_3'$, true), the end point object at offset $O_G'$ along directed way ($W_4'$, true), and a vector therebetween. The returned linear object comprises the start point object at offset $O_F'$ along directed way ($W_1'$, true), the end point object at offset $O_G'$ along directed way ($W_4'$, true), and the first vector concatenated with the second vector, concatenated with the third vector, or ($W_1'$, true), ($W_2'$, true), ($W_3'$, true), ($W_4'$, true).

As should be understood, in example embodiments, linear objects are mapped from the source graph to the target graph by mapping two or more point objects defining the linear object (e.g., a start point object and an end point object) from the source graph to the target graph.

As noted above, example embodiments of the present invention provide for mapping an object (e.g., a point object or a linear object) from a source graph to a target graph in an efficient, robust, and error tolerant manner. For example, a user of an in car navigation system may wish to switch from a 2D map to a 3D map and a path from a start location to a destination location that was computed in the 2D map must be transferred to the 3D map. In another example, a live map may be updated to include real-time (or near real-time) speed limits and/or road conditions and the updated information must be transferred to another map that is being displayed to the user. However, the map information/data of a first map may not be directly matchable to the map information/data of a second map. For example, link or roadway identifying information may be changed between different maps or different versions of a map. For example, a particular road in one map may be listed as US 23 and in another map as Claremont Ave. Example embodiments of the present invention provide a technical and novel solution to this problem. In particular, at least some junctions may be tagged with a unique junction identifier that uniquely identifies the corresponding junction in both the source map and the target map. These unique junction identifiers allow an object to be mapped from the source map to the target map by using the unique junction identifiers to easily and quickly transfer inflated closure sets about the object to the target map. The inflated closure sets may then be deflated in the target map to identify the object in the target map in an efficient, robust, and error tolerant manner.

IV. Example Apparatus

The apparatus of an example embodiment may be embodied by or associated with a variety of computing devices including, for example, such as a navigation system including an in-vehicle navigation system, a personal navigation device (PND) or a portable navigation device, an advanced driver assistance system (ADAS), a global positioning system (GPS), a cellular telephone, a mobile phone, a personal digital assistant (PDA), a watch, a camera, a computer, and/or other device that can perform navigation-related functions, such as digital routing and map display. Additionally or alternatively, the apparatus may be embodied in other types of computing devices, such as a server, a personal computer, a computer workstation, a laptop computer, a plurality of networked computing devices or the like, that are configured to analyze probe points for route planning or other purposes. In this regard, FIG. 13 depicts the apparatus 10 of an example embodiment that may be embodied by various computing devices including those identified above. As shown, the apparatus of an example embodiment may include, may be associated with or may otherwise be in communication with a processor 12 and a memory device 14 and optionally a communication interface 16 and/or a user interface 18.

In some embodiments, the processor 12 (and/or co-processors or any other processing circuitry assisting or otherwise associated with the processor) may be in communication with the memory device 14 via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the apparatus 10 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the apparatus 10 may include a user interface 18 that may, in turn, be in communication with the processor 12 to provide output to the user, such as a proposed route, and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 14, and/or the like).

The apparatus 10 may optionally include a communication interface 16. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the apparatus 10 of an example embodiment, a navigation system may also include or have access to a geographic database that includes a variety of data (e.g., map information/data) utilized in constructing a route or navigation path and determining the time to traverse the route or navigation path. For example, a geographic database may include node data records (e.g., including anchor node data records comprising junction identifiers), road segment or link data records, point of interest (POI) data records and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In an example embodiment, the road segment data records are links or segments, e.g., maneuvers of a maneuver graph, representing roads, streets, or paths, as can be used in the calculated route or recorded route information for determination of one or more personalized routes. The node data records are end points corresponding to the respective links or segments of the road segment data records. The road link data records and the node data records represent a road network, such as used by vehicles, cars, and/or other entities. Alternatively, the geographic database can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies an apparatus 10 in accordance with an example embodiment may determine the time to traverse a route that includes one or more turns at respective intersections more accurately.

V. Apparatus, Methods, and Computer Program Products

As described above, FIGS. 1, 3, 5, 6, 9, and 10 illustrate flowcharts of an apparatus 10, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14 of an apparatus employing an embodiment of the present invention and executed by the processor 12 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for displaying a target object in a target graph, the target object corresponding to an object in a source graph, the method comprising:
   identifying the object in the source graph by an apparatus comprising circuitry and memory, the circuitry comprising processor circuitry and user interface circuitry and the memory storing (a) a geographic database comprising a first set of map data corresponding to the source graph and (b) a geographic database comprising a second set of map data corresponding to the target graph, the object being identified by a directed way and an offset there along;
   defining, by the processor circuitry and based on the first set of map data, a closure graph around the object in the source graph, the closure graph comprising at least one vertex;
   building, by the processor circuitry and based on the first set of map data, at least one closure set based on the closure graph, the closure set comprising at least one path having either a start node or end node of the directed way at a first end of the path and an anchor node at a second end of the path, the second end being opposite the first end, wherein an anchor node is a junction that is tagged with a junction identifier, the junction identifier configured to uniquely identify the junction in both the source graph and the target graph;
   identifying, by the processor circuitry and based on the second set of map data, the anchor nodes of the closure set on the target graph, the identifying based at least in part on the junction identifier associated with the anchor node;
   deflating, by the processor circuitry and based on the second set of map data, the closure set on the target graph to identify a target object in the target graph that corresponds to the object in the source graph; and
   causing, by user interface circuitry, a user interface of the apparatus to display the target object in the target graph in at least near real time with respect to the identifying of the object in the source graph.

2. A method according to claim 1 further comprising:
   mapping the target object back into the source graph;
   determining a distance between the target object that was mapped back into the source graph and the object in the source graph; and
   determining whether the distance is greater than a consistency check threshold.

3. A method according to claim 1 wherein defining the closure graph around the object in the source graph comprises:
   identifying a set of ways, each way of the set of ways having either an end point of the directed way as a start point of the way or a start point of the directed way as an end point of the way.

4. A method according to claim 3 wherein building the closure set comprises:
   visiting each way of the set of ways marked as to be visited,
   wherein visiting a way of the set of ways comprises:
      determining if an end node of the way is a first anchor node;
      if the end node of the way is not a first anchor node, marking all ways outgoing from the end node of the way as to be visited; and
      if the end node of the way is a first anchor node:
         adding a path from either the start node or the end node of the directed way to the anchor node to the closure set, and not marking any ways outgoing from the first anchor node as to be visited.

5. A method according to claim 4 wherein visiting each way marked as to be visited comprises using a Dijkstra's algorithm with a destination parameter of the Dijkstra's algorithm set to unknown.

6. A method according to claim 1 wherein the at least one closure set comprises (a) a left closure set comprising one or more left anchor nodes and (b) a right closure set comprising one or more right anchor nodes, and wherein deflating the closure set in the target graph comprises, for each pair of left and right anchor nodes:
identifying a set of shortest paths from the left anchor node to the right anchor node, wherein each of the shortest paths of the set of shortest paths corresponds to one way outgoing from the left anchor node;
for each path in the set of shortest paths:
determining a length of the path and determining that the length of the path is not greater than a threshold length for the left and right anchor node pair;
computing a target offset along the path; and
computing a descriptor of the quality of mapping of the path;
selecting the path having the highest quality of mapping as indicated by the descriptor of the quality of mapping of the path; and
identifying the target object based at least in part on the target offset of the selected path.

7. A method according to claim 6 wherein identifying the set of shortest paths from the left anchor node to the right anchor node comprises using Dijkstra's algorithm.

8. A method according to claim 6 wherein the descriptor of the quality of the mapping of the path is a penalty that is computed based at least in part on a distance between at least one point on the shortest path from the left anchor node to the right anchor node that includes the directed way in the source graph and a corresponding at least one point on the path and wherein a lower penalty indicates a higher quality of mapping.

9. A method according to claim 1 wherein the object is one of a start point object, an end point object, or a midway point object of a linear object being mapped from the source graph to the target graph.

10. An apparatus comprising processor circuitry, user interface circuitry for controlling a user interface of the apparatus, and at least one memory, the at least one memory storing (a) a geographic database comprising a first set of map data corresponding to a source graph, (b) a geographic database comprising a second set of map data corresponding to a target graph, and (c) computer program code, the at least one memory and the computer program code configured to, with the processor circuitry, cause the apparatus to at least:
identify, based on the first set of map data, an object in the source graph, the object being identified by a directed way and an offset there along;
define, based on the first set of map data, a closure graph around the object in the source graph, the closure graph comprising at least one vertex;
build, based on the first set of map data, at least one closure set based on the closure graph, the closure set comprising at least one path having either a start node or end node of the directed way at a first end of the path and an anchor node at a second end of the path, the second end being opposite the first end, wherein an anchor node is a junction that is tagged with a junction identifier, the junction identifier configured to uniquely identify the junction in both the source graph and the target graph;
identify, based on the second set of map data, the anchor nodes of the closure set on the target graph, the identifying based at least in part on the junction identifier associated with the anchor node;
deflate, based on the second set of map data, the closure set on the target graph to identify a target object in the target graph that corresponds to the object in the source graph; and
cause the user interface circuitry to cause the user interface to display the target object in the target graph in at least near real time with respect to the identifying of the object in the source graph.

11. An apparatus according to claim 10 wherein the at least one memory and the computer program code are configured to, with the processor, cause the apparatus to:
map the target object back into the source graph;
determine a distance between the target object that was mapped back into the source graph and the object in the source graph; and
determine whether the distance is greater than a consistency check threshold.

12. An apparatus according to claim 10 wherein to define the closure graph around the object in the source graph the at least one memory and the computer program code are configured to, with the processor, cause the apparatus to identify a set of ways each way of the set of ways having either an end point of the directed way as a start point of the way or a start point of the directed way as an end point of the way.

13. An apparatus according to claim 12 wherein to build the closure set the at least one memory and the computer program code are configured to, with the processor, cause the apparatus to:
visit each way of the set of ways marked as to be visited, wherein to visit a way of the set of ways the at least one memory and the computer program code are configured to, with the processor, cause the apparatus to:
determine if an end node of the way is a first anchor node;
if the end node of the way is not a first anchor node, mark all ways outgoing from the end node of the way as to be visited; and
if the end node of the way is a first anchor node:
add a path from either the start node or the end node of the directed way to the anchor node to the closure set, and
not mark any ways outgoing from the first anchor node as to be visited.

14. An apparatus according to claim 13 wherein visiting each way marked as to be visited comprises using a Dijkstra's algorithm with a destination parameter of the Dijkstra's algorithm set to unknown.

15. An apparatus according to claim 10 wherein the at least one closure set comprises (a) a left closure set comprising one or more left anchor nodes and (b) a right closure set comprising one or more right anchor nodes, and wherein to deflate the closure set in the target graph the at least one memory and the computer program code are configured to, with the processor, cause the apparatus to, for each pair of left and right anchor nodes:
identify a set of shortest paths from the left anchor node to the right anchor node, wherein each of the shortest paths of the set of shortest paths corresponds to one way outgoing from the left anchor node;

for each path in the set of shortest paths:
   determine a length of the path and determine that the length of the path is not greater than a threshold length for the left and right anchor node pair;
   compute a target offset along the path; and
   compute a descriptor of the quality of mapping of the path;
select the path having the highest quality of mapping as indicated by the descriptor of the quality of mapping of the path; and
identify the target object based at least in part on the target offset of the selected path.

16. An apparatus according to claim 15 wherein to identify the set of shortest paths from the left anchor node to the right anchor node the at least one memory and the computer program code are configured to, with the processor, cause the apparatus to use Dijkstra's algorithm.

17. An apparatus according to claim 15 wherein the descriptor of the quality of the mapping of the path is a penalty that is computed based at least in part on a distance between at least one point on the shortest path from the left anchor node to the right anchor node that includes the directed way in the source graph and a corresponding at least one point on the path and wherein a lower penalty indicates a higher quality of mapping.

18. An apparatus according to claim 10 wherein the object is one of a start point object, an end point object, or a midway point object of a linear object being mapped from the source graph to the target graph.

19. A computer program product comprising at least one non-transitory computer-readable storage medium having computer-executable program code instructions stored therein, the computer-executable program code instructions comprising program code instructions configured to, when executed by processor circuitry of an apparatus, cause the processor circuitry to:
   identify an object in a source graph, the object being identified by a directed way and an offset there along, wherein the source graph is stored in a memory of the apparatus as a geographic database storing a first set of map data;
   define, based on the first set of map data, a closure graph around the object in the source graph, the closure graph comprising at least one vertex;
   build, based on the first set of map data, at least one closure set based on the closure graph, the closure set comprising at least one path having either a start node or end node of the directed way at a first end of the path and an anchor node at a second end of the path, the second end being opposite the first end, wherein an anchor node is a junction that is tagged with a junction identifier, the junction identifier configured to uniquely identify the junction in both the source graph and a target graph, wherein the target graph is stored in a memory of the apparatus as a geographic database storing a second set of map data;
   identify, based on a second set of map data, the anchor nodes of the closure set on the target graph, the identifying based at least in part on the junction identifier associated with the anchor node;
   deflate, based on the second set of map data, the closure set on the target graph to identify a target object in the target graph that corresponds to the object in the source graph; and
   cause user interface circuitry of the apparatus to cause a user interface of the apparatus to display the target object in the target graph in at least near real time with respect to the identifying of the object in the source graph.

20. A computer program product according to claim 19 wherein the computer-executable program code instructions further comprise program code instructions configured to
   map the target object back into the source graph;
   determine a distance between the target object that was mapped back into the source graph and the object in the source graph; and
   determine whether the distance is greater than a consistency check threshold.

* * * * *